(12) United States Patent
Cavanaugh

(10) Patent No.: US 9,721,111 B2
(45) Date of Patent: Aug. 1, 2017

(54) METHODS OF DYNAMICALLY SECURING ELECTRONIC DEVICES AND OTHER COMMUNICATIONS THROUGH ENVIRONMENTAL AND SYSTEM MEASUREMENTS LEVERAGING TAILORED TRUSTWORTHY SPACES

(71) Applicant: Internet Infrastructure Services Corporation, Flanders, NJ (US)

(72) Inventor: Steven Cavanaugh, Chatham, NJ (US)

(73) Assignee: Internet Infrastructure Services Corporation, Flanders, NJ (US)

(*) Notice: Subject to any disclaimer, the term of this patent is extended or adjusted under 35 U.S.C. 154(b) by 131 days.

(21) Appl. No.: 14/523,281

(22) Filed: Oct. 24, 2014

(65) Prior Publication Data
US 2015/0121506 A1  Apr. 30, 2015

Related U.S. Application Data

(60) Provisional application No. 61/895,020, filed on Oct. 24, 2013.

(51) Int. Cl.
*G06F 21/60* (2013.01)
*G06F 21/62* (2013.01)

(52) U.S. Cl.
CPC ............ *G06F 21/62* (2013.01); *G06F 21/604* (2013.01); *G06F 21/6218* (2013.01)

(58) Field of Classification Search
CPC ...... G06F 21/6218; G06F 21/31; G06F 21/60; G06F 21/604; G06F 21/62;
(Continued)

(56) References Cited

U.S. PATENT DOCUMENTS 8,539,567 B1 * 9/2013 Logue ................. H04L 63/0884
709/223
8,789,136 B2 * 7/2014 Erhart ................... G06F 21/629
455/26.1
(Continued)

OTHER PUBLICATIONS

International Preliminary Report on Patentability filed in PCT/US2014/062223; dated Apr. 26, 2016; 15 pgs.
(Continued)

*Primary Examiner* — Tae Kim
(74) *Attorney, Agent, or Firm* — Banner & Witcoff, Ltd.

(57) ABSTRACT

This invention is for a system capable of securing one or more fixed or mobile computing device and connected system. Each device is configured to change its operating posture by allowing, limiting, or disallowing access to applications, application features, devices features, data, and other information based on the current Tailored Trustworthy Space (TTS) definitions and rules which provided for various situationally dependent scenarios. Multiple TTS may be defined for a given deployment, each of which specifies one or more sensors and algorithms for combining sensor data from the device, other connected devices, and/or other data sources from which the current TTS is identified. The device further achieves security by loading digital credentials through a unidirectional multidimensional physical representation process which allows for the device to obtain said credentials without the risk of compromising the credential issuing system through the data transfer process. This secure system methodology may be used to create a Mobile Secure Compartmentalized Information Facility (M-SCIF), among other applications.

23 Claims, 11 Drawing Sheets

The various security states of one potential implementation of the secure system methodology

(58) Field of Classification Search
CPC .............. G06F 21/6209; G06F 21/629; G06F 21/6245; G06F 2221/2111; G06F 2221/2113; G06F 2221/2143
See application file for complete search history.

(56) References Cited

U.S. PATENT DOCUMENTS

| | | | | |
|---|---|---|---|---|
| 8,832,855 | B1* | 9/2014 | Enderwick | G06F 21/121 |
| | | | | 726/27 |
| 8,955,152 | B1* | 2/2015 | Enderwick | G06F 21/60 |
| | | | | 705/51 |
| 9,071,580 | B2* | 6/2015 | Pigeon | H04L 63/0435 |
| 9,075,955 | B2* | 7/2015 | Schieman | G06F 21/53 |
| 9,143,529 | B2* | 9/2015 | Qureshi | H04L 63/20 |
| 9,183,380 | B2* | 11/2015 | Qureshi | G06F 21/53 |
| 9,286,471 | B2* | 3/2016 | Qureshi | G06F 21/53 |
| 9,323,911 | B1* | 4/2016 | Alikhani | G06F 21/31 |
| 9,378,359 | B2* | 6/2016 | Qureshi | G06F 21/53 |
| 9,467,474 | B2* | 10/2016 | Barton | G06F 9/4445 |
| 9,529,996 | B2* | 12/2016 | Qureshi | G06F 21/53 |
| 2002/0048377 | A1 | 4/2002 | Vaudrey et al. | |
| 2008/0134347 | A1* | 6/2008 | Goyal | G06F 21/6209 |
| | | | | 726/29 |
| 2010/0311391 | A1 | 12/2010 | Siu et al. | |
| 2012/0158161 | A1 | 6/2012 | Cohn et al. | |
| 2013/0104187 | A1 | 4/2013 | Weidner | |
| 2014/0007222 | A1* | 1/2014 | Qureshi | G06F 21/10 |
| | | | | 726/16 |
| 2014/0032691 | A1* | 1/2014 | Barton | H04L 41/00 |
| | | | | 709/206 |
| 2014/0032759 | A1* | 1/2014 | Barton | H04L 67/10 |
| | | | | 709/225 |
| 2014/0033271 | A1* | 1/2014 | Barton | H04L 67/10 |
| | | | | 726/1 |
| 2014/0040979 | A1* | 2/2014 | Barton | H04L 63/20 |
| | | | | 726/1 |
| 2014/0108649 | A1* | 4/2014 | Barton | G06F 9/45533 |
| | | | | 709/224 |
| 2014/0108793 | A1* | 4/2014 | Barton | G06F 21/6218 |
| | | | | 713/165 |
| 2014/0109176 | A1* | 4/2014 | Barton | G06F 9/45533 |
| | | | | 726/1 |
| 2014/0331275 | A1* | 11/2014 | Singh | G06F 21/52 |
| | | | | 726/1 |

OTHER PUBLICATIONS

International Search Report and Written in PCT/US2014/062223, issued Feb. 3, 2015, 19 pages.

Mar. 21, 2017—(EP) Extended Search Report—App. 14856340.6.

* cited by examiner

```
<TTSDefinition name="area 1">
  <Measurement instrument="audio:white-noise" >
    <Scale factor="4" />
    <Param name="updateInterval" value="1000" />
    <Param name="peakThresh" value="0.3" />
    <Param name="nearPeakPercent" value="0.7" />
    <Param name="stdPercent" value="0.05" />
    <Param name="minFreq" value="0" />
    <Param name="maxFreq" value="5000" />
  </Measurement>
  <Measurement instrument="light:screen-viewing" >
    <Raw />
    <Param name="luxOffset" value="1" />
    <Param name="deviceScale" value="0.1" />
    <Param name="updateInterval" value="1000" />
  </Measurement>
  <Measurement instrument="camera:face-count" >
    <Level AssignedValue="1" >
      <Range HighValue="2" LowValue="0" />
    </Level>
    <Level AssignedValue="0" >
      <Range LowValue="3" />
    </Level>
    <IgnoreIfUnavailable UnavailableValue="-1" />
    <Param name="updateInterval" value="5000" />
  </Measurement>
  <CalculationMethod emptyValue="0" minimumEntries="1" >
    <Average />
  </CalculationMethod>
</TTSDefinition>
```

FIG. 1 An example of a particular definition of a TTS measurement expressed in XML format.

```
<SystemConfiguration>
  <ApplicationList>
    <Application>
      <Name>Test Application</Name>
      <TTSRules>
        <TTSRule usesDefinition="area 1" action="allowLaunch"
          threshold="1" thresholdType="passAbove"/>
        <TTSRule usesDefinition="feature A" action="allowCamera"
          high="5" low="1" thresholdType="withinRange"/>
        <TTSRule usesDefinition="dataaccess" action="purgeKey"
          threshold="2" thresholdType="passBelow"/>
      </TTSRules>
    </Application>
  </ApplicationList>
  <TTSRules>
    <TTSRule usesDefinition="wipeCheck" action="wipeDevice"
      threshold="1" thresholdType="passAbove"/>
    <TTSRule usesDefinition="noiseMeasurement" action="allowPhoneCall"
      threshold="5" thresholdType="passAbove"/>
  </TTSRules>
</SystemConfiguration>
```

FIG. 2 An example of how multiple TTS measurement definitions may be used to define various TTS states of the system and a particular application as expressed in XML format.

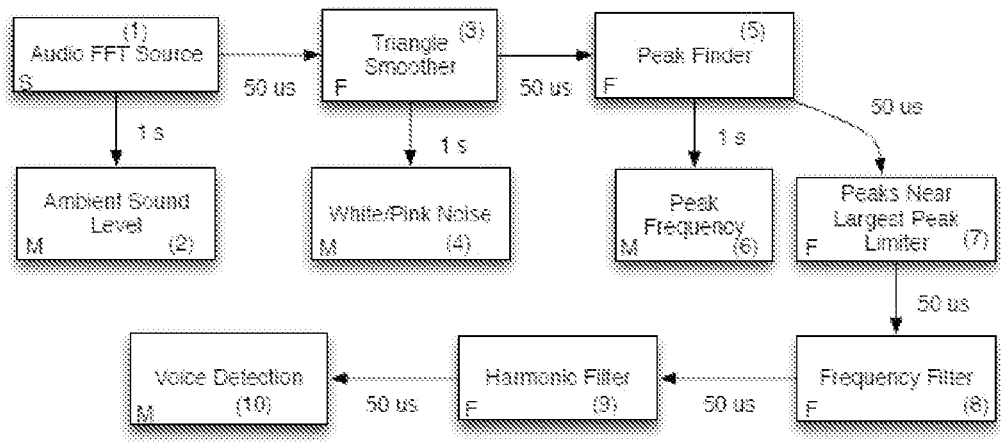

FIG. 3 An example of the flow of the on device processing of audio data from the audio FFT source (marked with S) through various filters (marked with F), resulting in multiple measurements (marked with M). Note that the result of a filter may be used multiple times for multiple purposes, automatically operating at the minimum data rate required to satisfy all of the dependent consumers of data.

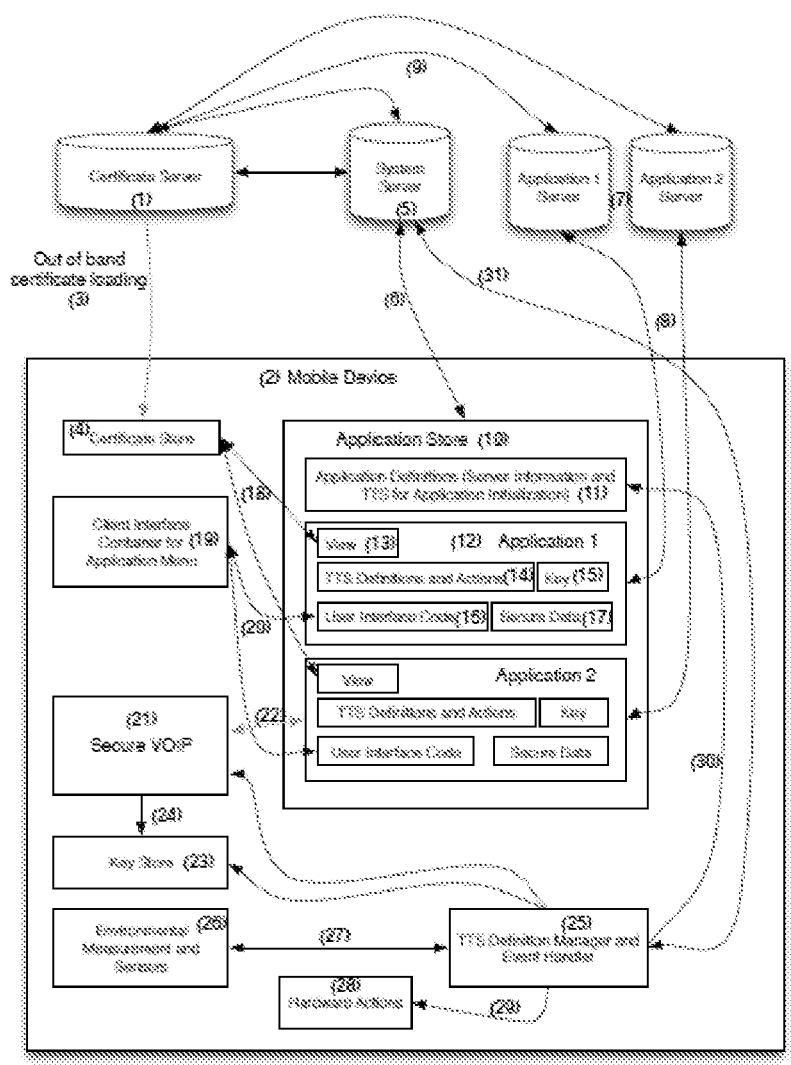
FIG. 4 The various components of one potential implementation of the secure system methodology as deployed on a device.

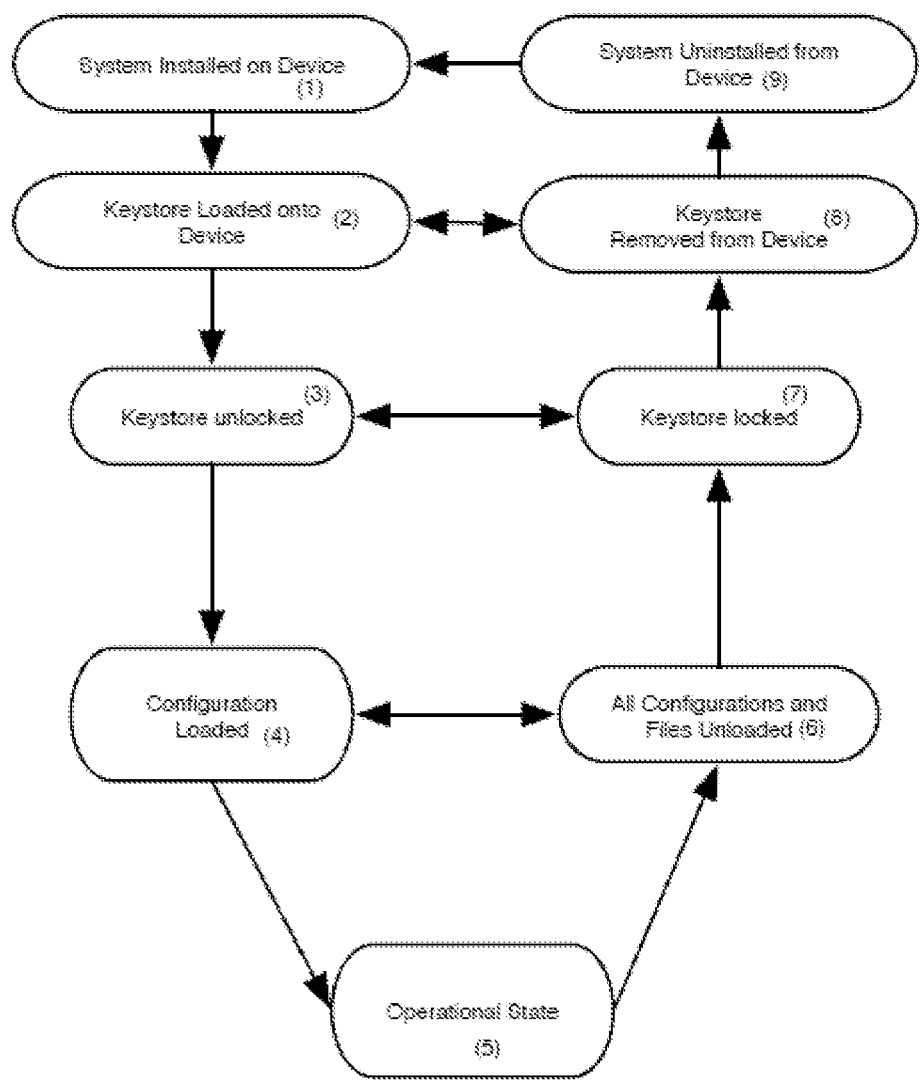
FIG. 5 The various security states of one potential implementation of the secure system methodology

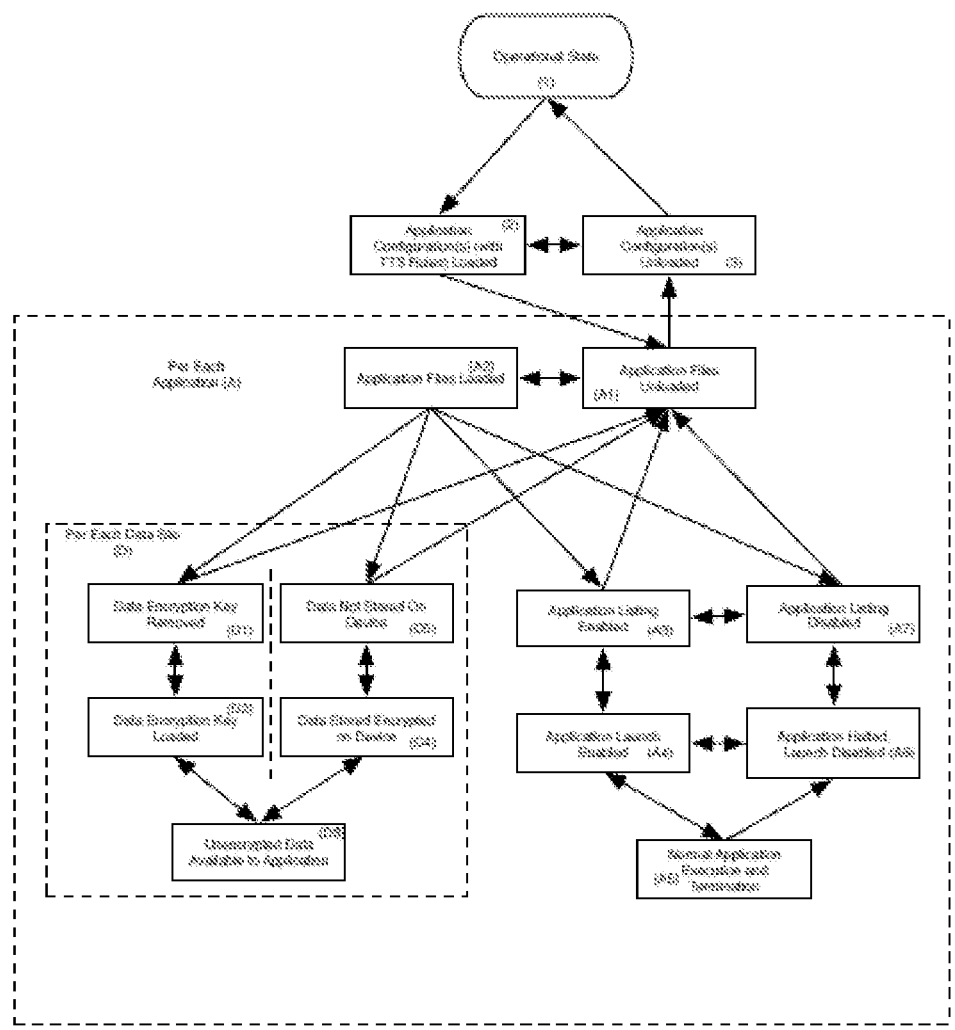
FIG. 6 The various security states of one potential implementation of the secure system methodology

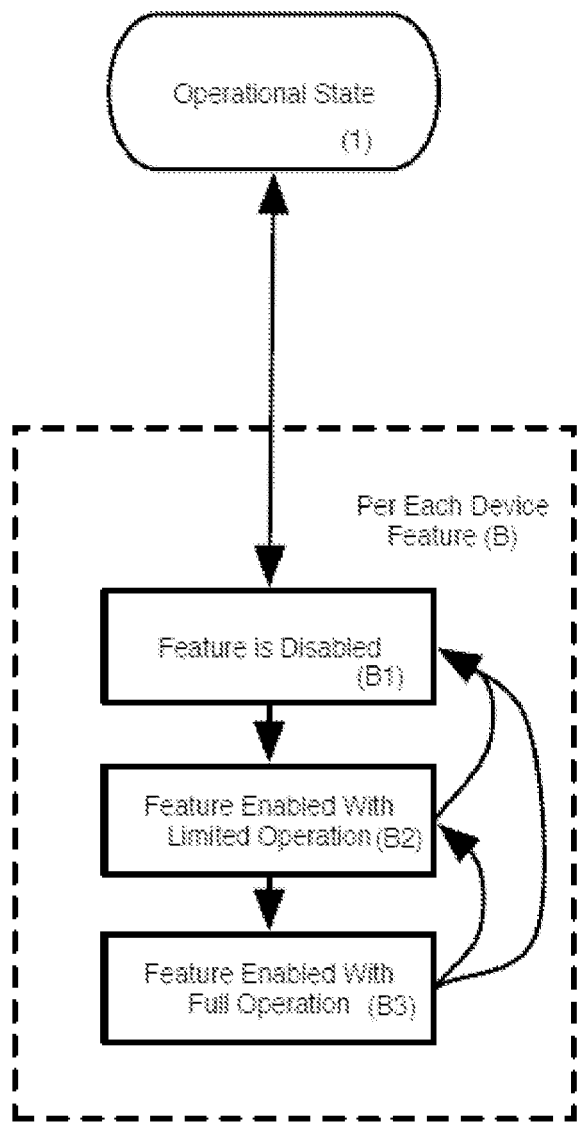
FIG. 7 The various security states of one potential implementation of the secure system methodology

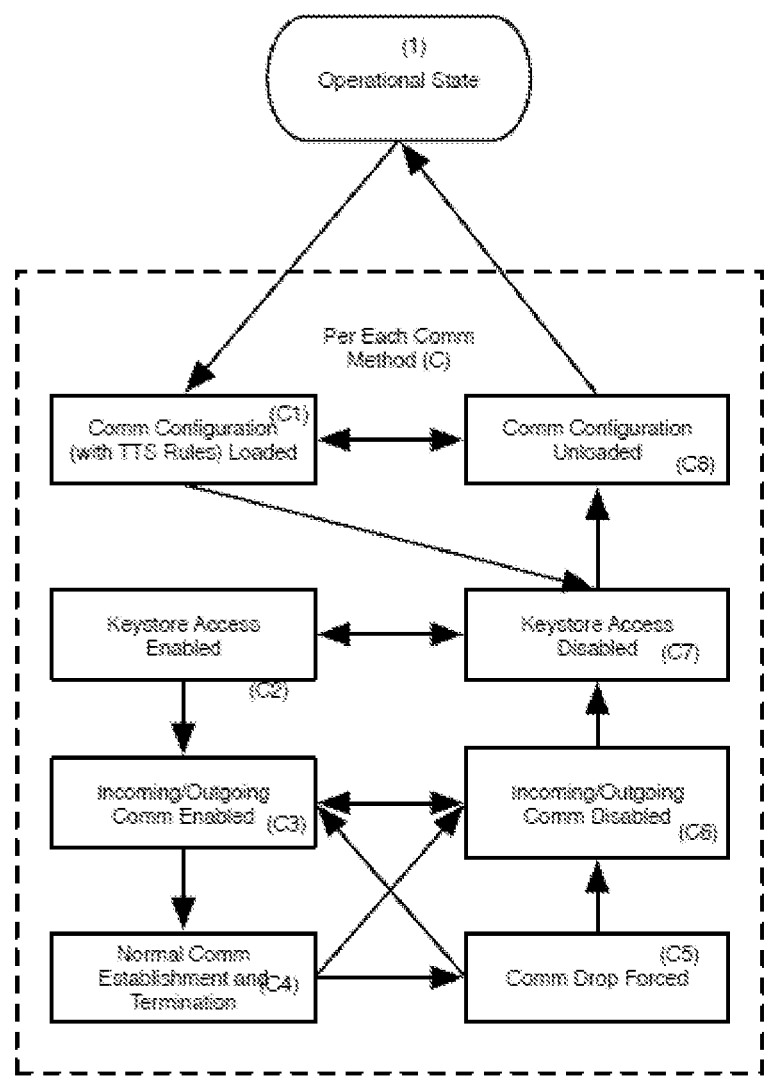
FIG. 8 The various security states of one potential implementation of the secure system methodology

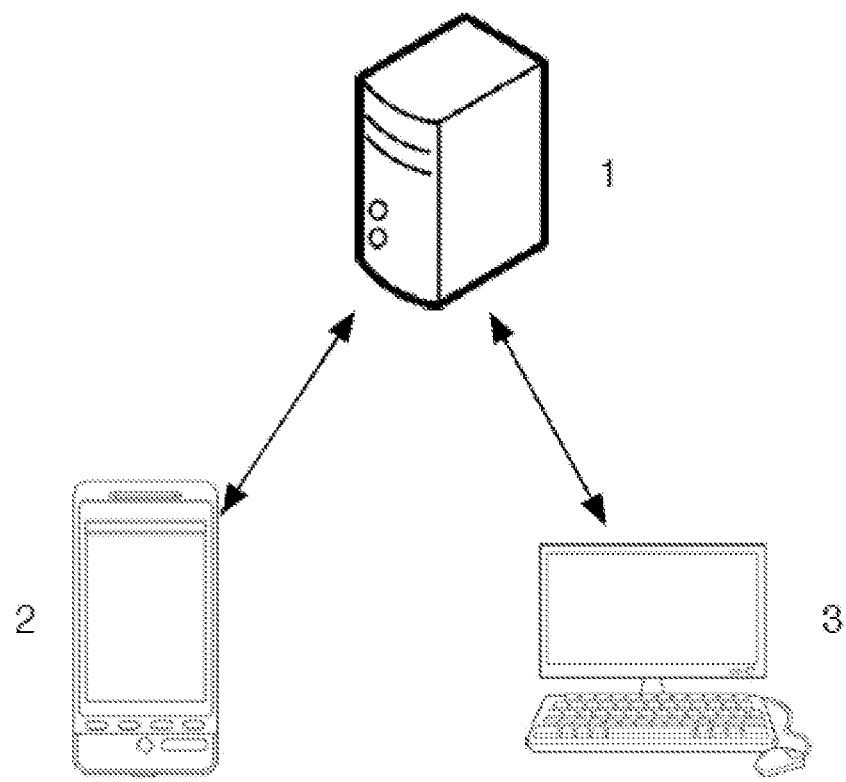
FIG. 9 One potential implementation of the secure system methodology as used in a multiple device TTS system. TTS measurements from both a mobile device and desktop computer create a security state of the two device system which is analyzed and acted upon by a enterprise wide security server.

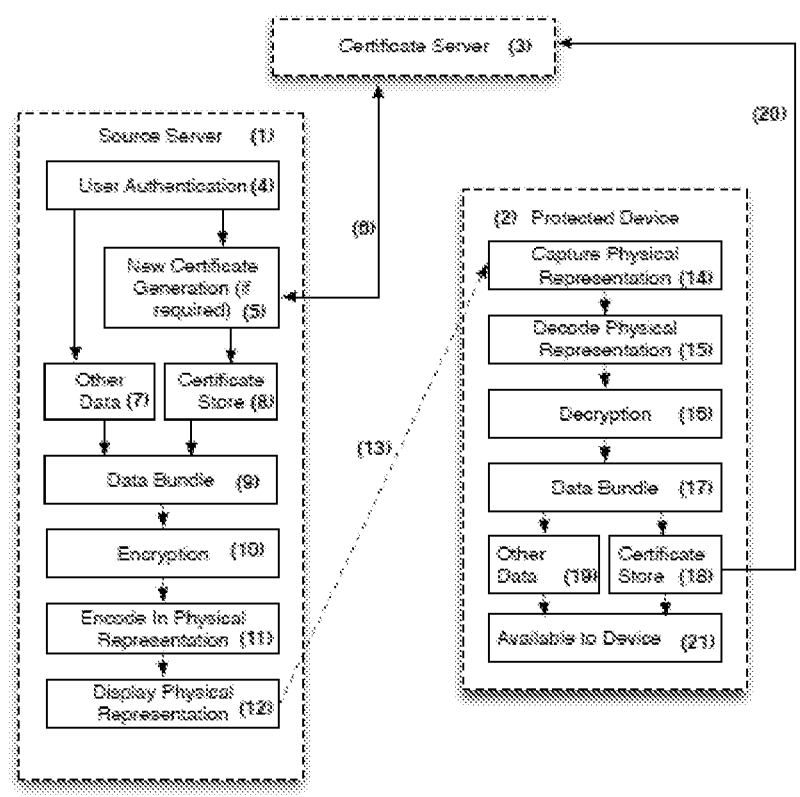
FIG. 10 The procedural flow for out of band security credentials loading

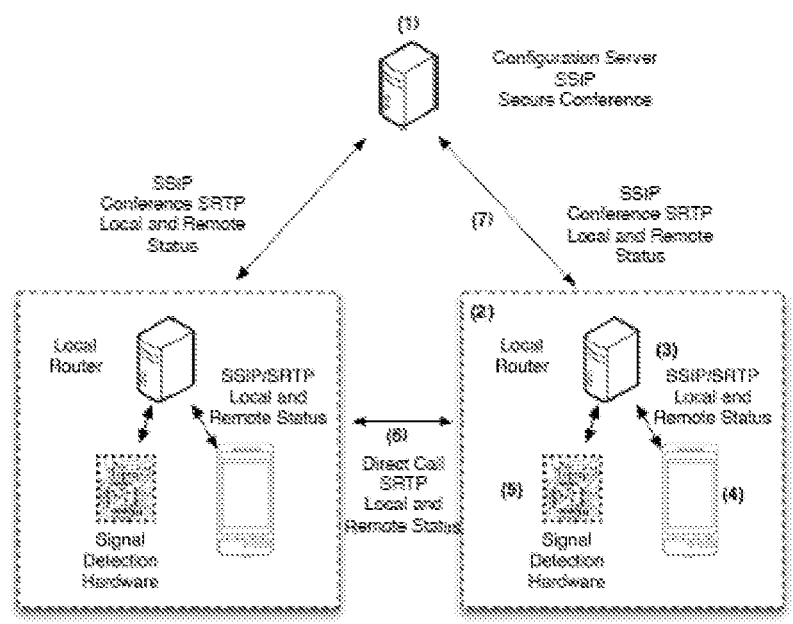
FIG. 11 An implementation of the secure system methodology which provides for a Mobile Secure Compartmented Intelligence Facility (M-SCIF)

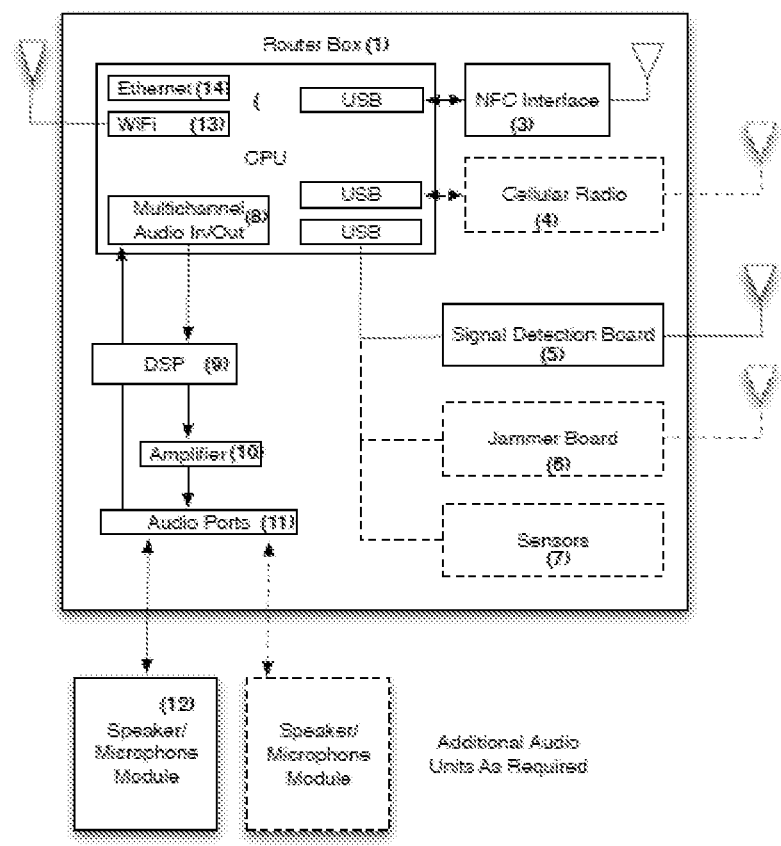
FIG. 12 A diagram of the components of the router box used in the M-SCIF implementation of the secure system methodology

METHODS OF DYNAMICALLY SECURING ELECTRONIC DEVICES AND OTHER COMMUNICATIONS THROUGH ENVIRONMENTAL AND SYSTEM MEASUREMENTS LEVERAGING TAILORED TRUSTWORTHY SPACES

RELATED APPLICATIONS

This application claims priority to and the benefit of U.S. Patent Application 61/895,020, entitled "METHODS OF SECURING ELECTRONIC DEVICES AND OTHER COMMUNICATIONS," which was filed on Oct. 24, 2013, the disclosure of which is incorporated herein by reference.

FIELD OF THE INVENTION

The use of a fixed or mobile computing device in an environment with varying and changing levels of trust, security, and requirements for application and data access.

The measurement of hardware and software environmental and system sensors on a device for the purpose of determining the environment, security, and operational state of a device to provide an understanding of situational awareness and to provide measurements for the identification of Tailored Trustworthy Spaces (TTS).

The automated adjustment to available application features and data as accessed by a user or system based on changing conditions of security, location, use, or other parameters. This is the concept known as Tailored Trustworthy Spaces (TTS).

The definition of a Context Aware prediction/monitoring/alerting-action/data warehousing system with methods in near-real time comparison of defined security level scenarios (Tailored Trustworthy Spaces) with user actions and current device sensor data.

The use of a fixed or mobile computing device in an environment with varying and changing levels of trust, security and application/data authenticated access.

The use of digital credentials for the identification of a electronic device or computer, the establishment of trust between computers or electronic devices, and the establishment of a secure data link between devices using Public/Private Key Infrastructure and other cryptologic methods.

The provisioning of a device with digital credentials which are obtained from a credential authority whereby the device to be provisioned is of a less secure or trusted state than the security and trust state of the issuing authority.

The unidirectional data transfer from a sending secure system to a receiving insecure system (such as from a classified to unclassified system) whereby the receiver must not be able to introduce any data, code, or other material into the sending system.

BACKGROUND OF THE INVENTION

There are existing mobile device security solutions referred to Mobile Device Management (MDM) systems that catalog, assign, track and maintain users, devices, applications and data at a binary acceptable or not acceptable security level. As the complexity of business and data security increases there are mandates to create a user security awareness that can react to security policy with multiple varied states of operation beyond the current binary restriction of allowed or disallowed.

Applications and systems such as disclosed in U.S. Patent US20080009264, U.S. Pat. No. 7,373,137 and U.S. Pat. No. 8,789,136 define secure events and configurations where a device (via communication to a server or in isolation via an internal count down algorithm) determine if the device security is compromised and thus data and application access should be limited or wiped.

Existing systems do not leverage the increased computational power of the modern devices or use methods of onboard sensor data capture and analysis to produce a contextual awareness of the user, device and assigned security policies. The need for a near real time contextual system with predictive support or deterioration of the security states as represented by multiple sensor readings, other data sources, and algorithms compared to assigned security policies are required by both Government and Industry.

Electronic systems and devices which are subject to varying conditions of use, either by virtual of physical mobility or varying access within a given location, are subject to security concerns whereby sensitive data, application functions, or other information, may be inadvertently or purposefully exposed to unauthorized users or entities.

The concept known as Tailored Trustworthy Spaces (TTS) which encompasses the application of varying levels of security including application feature and data access controls to an electronic system or device based on the current operating posture of that device.

Security policies are often generated to provide information assurance and access control, but are often difficult to enforce when they apply to the operation of one or more devices within a system, especially when these devices are of a type not subject to physical access control, or of a type which may be moved from the normal location of operation, or of a type which are considered mobile and constantly being moved from one location to another during normal operations.

Mobile devices, such as modern cell phones, tablets, watches, and others, often contain environmental sensors which may be used to measure, determine, or infer the nature and extent of user interaction with the device, or the operational condition or environment of the device. Non mobile devices (desktop computers, servers, and other equipment), while not normally fitted with such sensors, may also contain such sensors which may be added as peripherals, or which may be included in future designs of such systems.

Digital certificates are a type of digital credential which is used for user/device identification, the encrypting of data and communications, and the signing of data.

Existing systems do not have a suitable method for loading digital credentials from a secure sender to an insecure receiver without including a vulnerability whereby the insecure receiver would potentially be able to exploit vulnerabilities in the secure sender and, among other things, inject unwanted or unauthorized code or data into the sender system.

OBJECTS OF THE INVENTION

It is an object of this invention to provide a methodology to be implemented in an electronic system or device which allows for the dynamic varying of operating capabilities, including application functions, data access, device features, and the protection of other information, based upon measurements made by the system of the immediate and distant surroundings from which an assessment of the security posture of that system may be measured within some mathematical degree of certainty, from which the identification of one or more Tailored Trustworthy Spaces (TTS) are identified, and the appropriate data and application access and controls are applied. This object will be referred through this document as a secure system methodology, with the various components described being the numerous parts of the security system.

It is an object of this invention to provide a measurement of the operational state (security, user interaction, location, environmental conditions, etc.) of the device using one or more sensors or data feeds located on the device or otherwise attached to the device (either as a cabled or wireless peripheral) or otherwise made available to the device but not directly connected to and not necessarily in the immediate vicinity of the device (as an external data source connected by some network).

It is an object of this invention to provide a unidirectional means of transferring digital credential information and/or other data from a secure system to a less secure system, thereby allowing data to be transferred without the risk of the receiving device compromising the security of the sending system.

It is an object of this invention to provide a unidirectional means of transferring digital information, including device or system configuration information, user preference information, or any other information, along with or independent of the transfer of the digital credential information by the same method of object of the preceeding paragraph.

It is an object of this invention to provide a means of creating a mobile Secure Compartmentalized Information Facility (SCIF) system through the use of multiple devices secured using this invention and with additional components.

Still other objects and advantages of the invention will in part be obvious and will in part be apparent from the specification and drawings.

SUMMARY OF THE INVENTION

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

The invention describes a methodology for the incorporation of Tailored Trustworthy Spaces (TTS) into mobile and fixed devices which may be either independent or a part of a larger system. A means for defining the various TTS, the handling of various security states based on transitions from one TTS to another, and the various actions of these transitions is defined.

A means for incorporating onboard device hardware and software sensors, peripheral sensors, and data from sources external to the devices is provided within the secure system methodology. On device process of sensor data for TTS state identification and computation independent of external devices may be performed. Conversely, or in unison, sensor data or TTS measurements from multiple devices may be transmitted to a device which can combine the various measurements of multiple devices to create an overall TTS measurement representing the security state of a set of multiple devices.

Single or multiple TTS policies can govern the user access of device sensors, applications, data or device functions with dynamic alerts or device actions (including selective wipe (keys or keys and data), complete wipe, etc.). Non-mobile devices which may normally not contain built in sensors (desktop computers, servers and other equipment), may also be connected to the system with peripheral sensors or specialized hardware.

The system may employ a method of loading digital certificates from a secure sender to less secure or insecure device for the purposes of securing communication of user/device identification and authentication, application communication, data at rest storage, information assurance, and data signing. The method supports a unidirectional communication to limit exposure of the secure sending system to unauthorized injections of code or data.

In order to provide a means for an electronic system/device to adjust its security posture, including access to various application features, data, and other information, based on its current operating posture, optionally including measurements and data from other systems and devices, it is necessary to design a system which is capable of taking local measurements of its surroundings, extracting meaningful information from these measurements regarding its current operating posture, applying this meaningful information and optionally externally supplied information to a set of rules, and based on those rules, performing the necessary actions to limit or allow access to applications, data, or other information within the system or device.

The various components of the invention may be further incorporated into a mobile secure compartmentalized information facility (M-SCIF) providing features including active noise cancelation, an electromagnetically shielded RF tent, voice scrambling, secure communication, and electromagnetic countermeasures including signal jamming.

BRIEF DESCRIPTION OF THE DRAWINGS

For a more complete understanding of the invention, reference is made to the following description and accompanying drawings, in which the following is presented:

FIG. 1 is an example of a particular definition of a TTS measurement expressed in XML format;

FIG. 2 is an example of how multiple TTS measurement definitions may be used to define various TTS states of the system and a particular application as expressed in XML format;

FIG. 3 is an example of the flow of the on device processing of audio data;

FIG. 4 depicts the various components of one potential implementation of the secure system methodology as deployed on a device;

FIG. 5 depicts the various security states of one potential implementation of the secure system methodology;

FIG. 6 depicts the various security states of one potential implementation of the secure system methodology;

FIG. 7 The various security states of one potential implementation of the secure system methodology;

FIG. 8 depicts the various security states of one potential implementation of the secure system methodology;

FIG. 9 depicts one potential implementation of the secure system methodology as used in a multiple device TTS system;

FIG. 10 depicts the procedural flow for out of band security credentials loading;

FIG. 11 depicts an implementation of the secure system methodology which provides for a Mobile Secure Compartmented Intelligence Facility (M-SCIF); and FIG. 12 depicts a diagram of the components of the router box used in the M-SCIF implementation of the secure system methodology.

DETAILED DESCRIPTION OF THE PREFERRED EMBODIMENTS

The TTS measurement definitions, rules and actions may be described within secure system methodology in any machine readable data format. As an example, a TTS definition for a particular measurement definition encoded in XML format is presented in FIG. 1.

A TTS definition is given a name which can be referenced in TTS rules requiring this definition. It lists one or more measurement data sources, which can either be a hardware sensor, software sensor, external data source, or some combined result of multiple sensors. The value of the sensor output may be scaled, used raw, or assigned a value by taking the raw value and applying it to a continuous function, step function, or another algorithm. Parameters specific to the sensor being used may be passed to the sensor configuration. As a sensor may not be available on a particular device, a default value for a sensor to take when the sensor is not present on the device may be optionally specified. When multiple sensors are used in a TTS definition, a calculation method describing how the values from each sensor should be combined to produce a numerical results for the TTS definition is provided. A TTS measurement may take sensor values and/or other TTS measurement output values as input The configuration of the secure system includes in part a description of the various TTS measurements along with the actions to take when particular measurements achieve certain values, and may be represented in any machine readable data format. As an example, an excerpt of a secure system configuration encoded in XML format is presented in FIG. 2.

The example configuration includes a list of applications available to the device, and an application entry within that list including a number of TTS rules. Each TTS rule includes the named TTS definition that is used to provide a value for the rule, an action with the system to take when the value meets certain criteria, and a set of criterial, usually represented as a threshold or a range of allowed values of the TTS measurement for which the TTS rule applies.

TTS rules may be defined within the system as a system wide rule (controlling the general operation of the device including device lock and wipe capabilities) or may be specific to individual applications (for instance allowing viewing of an address book within a communications application), particular data types within an application (for instance viewing home phone numbers of contacts within an address book), various features on a device (such as a camera) or various communication methods of a device (such as cellular calling capability).

A TTS Manager component is used within the system to efficiently perform the necessary TTS measurements as required throughout the entire system, ensuring that the processing of data is minimized by reusing results across various measurement consumers. An example of a segment of the steps in performing the TTS measurements for audio spectrum data is given as an example in FIG. 3.

A single instance of an audio FFT data source is used for the entire set of TTS measurements requiring audio frequency data ([FIG. 3]). Various measurements may be extracted at different points in the processing chain ([FIG. 3-2], [FIG. 3-4], [FIG. 3-6], and [FIG. 3-10]), with various data transformations and processing taking place at different points along the chain ([FIG. 3-3], [FIG. 3-5], [FIG. 3-7], [FIG. 3-8], and [FIG. 3-9]). At each point in the chain, any data processing performed occurs at a rate which is minimum that is required to satisfy the constraints of all downstream data processors, thus minimizing computational and power load on the device performing the processing.

One potential implementation of the secure system methodology is presented in FIG. 4. In this implementation, the electronic device to be secured is in the form of a mobile device, as presented in [FIG. 4-2]. Component objects shown within that device may be implemented in some combination of hardware, software, or firmware. Prior to using the mobile device within the system, the user must first load a security credential (here in the form of a digital certificate) onto that device. The Certificate Server [FIG. 4-1] maintains a list of authorized users within the system and provides a repository for user credentials in the form of X.509 Certificates or in other forms providing authentication and encryption capabilities. The certificate is loaded through some out of band process ([FIG. 4-3]) into a certificate store on the device ([FIG. 4-4]) where it is encrypted with a user supplied password, biometric password, or some other key known to the device user to provide user directed locking/unlocking of the keystore.

The System/Configuration Server [FIG. 4-5] provides configuration information to the device, and the device accesses this information over a connection which may be encrypted (such as, but not limited to, HTTPS/TLS or SSL) during a Configuration Process [FIG. 4-6]. The configuration information is used to configure the device and includes, but is not limited to, information regarding the connection details of application servers ([FIG. 4-7]) and information defining device wide TTS rules and actions. Information pertaining to the configuration of specific applications is handled by the Application Store [FIG. 4-10] which in addition to managing application configurations in the Application Definitions [FIG. 4-11] may optionally also hold individually compartmentalized application containers. The application servers may be independent (providing compartmentalized and siloed application server instances) or operating on the same systems and infrastructure as the configuration server. The configuration server has no knowledge of the purpose, code, data, or specific TTS rules of an application, and only has TTS rules required to allow the application download to the device and the application launch.

The partitioning of the various components within the device may be accomplished programmatically and within a single executing program, through the use multiple modules on a single operating system, through the use of multiple virtual machines on a single hardware platform, through the use of multiple hardware components or connected hardware platforms, or using any combination of the above.

Most mobile devices contain a microphone, accelerometer and back facing camera, and many will also have a front facing camera, light sensor, proximity sensor, and temperature sensor. These common sensors, along with device specific sensors, and peripheral sensors, may be used in part to generate TTS measurements.

An example of an audio based TTS measurement is as follows. A Discrete Fourier Transform (DFT) is applied to audio sampled at 44,100 Hz to provide frequency spectrum information from 10 to 5000 Hz in bins with 10 Hz resolution. An ambient noise level is measured as the total power in all frequency bins. The spectrum information is often processed through a triangle smoother. The ambient peak frequency and associated peak power is measured. A white or pink noise detection algorithm is used to identify if white or pink noise is present, and determining if requirements of average power level and power distribution among the frequency bins are met. A capability for detecting if an alarm is sounding, by specifying a frequency range, minimum sounding time, and minimum duty cycle, is provided.

Additional measurements are taken after the data is further processed through peak finding and peak minimum power threshold filters. Harmonic groupings of peaks are formed, where a fundamental frequency is identified along with the presence of one or more harmonic peaks. A limit on the deviation of the harmonics from perfect integer multiples may be specified. One or more harmonic groups may be found in a sample, with the harmonics being assigned to the fundamental frequencies which are closest matches.

An attempt may be made to identify human voices using the harmonic data. On the principal that much of human speech, especially open vowel sounds, are generated in the throat and have a rich set of harmonic overtones, it may be possible to identify one or more potential speakers based on varying fundamental frequency and a restriction on harmonics which must be present. Once potential voices are identified, a sliding time window of 40 seconds is used where the voices are examined for overlap or alternating periods of pausing and vocalizing. The former may indicate periods of non human voice noise, or otherwise noisy area with much speech, while the latter may indicate actual conversation.

Measurements are taken to indicate the detection of no voices, the detection of one or more voices (where the number of detected voices is reported), the presence of conversational voices (where the number of voices in the conversation is presented), and the presence of overlapping voices (where the number of voices overlapping is presented). A fundamental frequency and standard deviation may be configured which represents the fundamental frequency that is typical of the device owner voice (assuming a Gaussian distribution), such that a measurement of the probability that a voice consistent with the owners voice is detected may be provided.

An example of a motion TTS measurement is as follows. The accelerometer is used to measure both movement of the device and movement of the user. A simple measurement is made to determine if the device is dropped from a height or tossed out at an angle near or above the horizon, and if so, how far the device falls. This measurement relies on the underlying accelerometer hardware and operating system implementation, and so the accuracy of the distance measured may not be consistent even though a clear indication of a fall or toss is gathered.

All additional measurements rely on sliding window Discrete Fourier Transform (DFT) which measure frequency and power information from 0 to 25 Hz in bins with resolution of 0.2 Hz. regarding device movement in both device and global coordinate systems along the x, y, z axis, in the xy, yz, xz planes, as a magnitude in all dimensions xyz, and as a rotation along the x, y, z axis.

In the device coordinate system, measurements are made to indicate user initiated actions, such as device shake, rotate, and flip.

In the global coordinate system, the goal is to identify the movement of the user in his environment, including pedestrian or mechanized movement (either powered or unpowered). Measurements are made along the global z, xy plane, and xy rotation, with 12 variables generated from the frequency and power information contained in these spectrums. A log-likelihood function is used, along with trained data, to make probability estimates that the device is still on a table, or that the device is being carried by a user who is either standing, walking while reading, walking with the device at his side, running in a straight line, running in a zig-zag (or evasive) pattern, or normally or quickly walking up and down a flight of stairs. The ability to take both instantaneous and time averaged measurements of the user movement provides insight not only to the status of the device, but the status of the user holding the device.

Some other TTS measurement examples are as follows. Other sensors are present on many devices which provide for additional measurements. The front facing camera may record the number of human faces detected as a means to see if one or more persons are actively looking at the screen. The light sensor may provide a measurement of whether the user is inside or outside of a building, and when combined with the current backlight sensor, indicates the potential for an actor to view the screen over the owner's shoulder. A temperature measurement provides ambient temperature. When coupled together, the temperature and light sensor could provide a means of confirming user location when outside based on expected weather reports. The proximity sensor allows for the owner to provide direct input to the device by either covering or exposing that sensor. A measurement of the screen state as either off, locked, or showing something other than the secure system user interface provides a risk measurement of screen observation. GPS, network based, and other location measurements may also be implemented.

An example TTS situation with regards to viewing the device screen, describing the measurements that may be used to detect a given user environment and risk profile, is as follows. The screen state indicates if the user is currently viewing a component of the platform. If so, it may be required that the screen brightness relative to the ambient light level is low enough such that the screen is not easily read from a distance. The detection of a face at least once every ten seconds might be required to ensure that the user is actively working with the device. The user might be required to place the device down or to stand (but not to run) in order to fully access all features of the application.

An example TTS situation with regards to secure VOIP, describing the measurements that may be used to detect a given user environment and risk profile, is as follows. A voice conversation utilizing VOIP between this device and another device might only be started when the ambient sound level is sufficiently loud and the ambient sound has a profile of white or pink noise, as to mediate any potential eavesdropping. The user might be prohibited from placing the device down, and the voice detection must identify at least one voice, the loss of either of which would cause the call to automatically end.

An example TTS situation with regards to detecting device loss, describing the measurements that may be used to detect a given user environment and risk profile, is as follows. Device loss may be a deliberate or an accidental action, either of which should at minimal lock the device certificate and keystore, immediately preventing secure data and network access, and resulting in the unloading of the applications and corresponding application and VOIP configurations. Intentional loss may be indicated by a shaking of the device or a tossing of the device into the air. Accidental loss might be indicated by the dropping of the device from a height, or the abandonment of the device (where it remains still for a time and no faces or user recognized voice is observed).

The methodology described may be implemented on any type of device. The following describes an implementation on an Android device as an application. The secure system is provided as an Android application distributed within an APK, but as such, does not contain any secure information.

Most applications, and all settings, are loaded into the program after installation on the target device. However, some application code may be distributed with the APK, for instance if it is for an application that will be available to most or all users of the system. The device interacts with authorized servers by presenting an X509 Certificate which is assigned to the user and specific device. This certificate allows the device to authenticate with a configuration server which provides the settings required to load applications and other features of the platform on the device. Including application configurations, VOIP configurations, and TTS measurement definition and action rules for the above, the configuration file is downloaded when required. All applications in this platform take the form of HTML5/CSS3 web applications which are rendered in separate and independent WebView components for each application. Through the use of WebViewClient.shouldInterceptRequest, all application file access and communication is tightly controlled. All network requests are passed though this interface, allowing the secure system to allow or disallow connection to the corresponding application server or other destinations depending on TTS rules. All requests for data files are also intercepted through this method, allowing TTS rules to be applied to specific types of data access, and allowing for data at rest to be decrypted on the fly and to remain decrypted in memory only for the duration that it is required for user interaction and display. Application specific files may be included in the distributed APK if the exposure of such is not a security concern. In most cases, the files would instead be provided by the application server across an HTTPS/TLS connection in the form of a tar file. The tar file may contain both unencrypted and AES256 encrypted files, the contents and encryption key of which may be unique to the presented device certificate. The key may be removed or reloaded from the device without removing the secure files to minimize the network bandwidth required to make the secure data available.

Following the example of the APK implementation for Android OS Devices, the system in that instance may take on the following security states Items beginning with a '*' require user intervention. The rest of the steps may automatically transition either down or up the list, depending on the TTS measurements and rules that have been specified. Each application and VOIP have separate TTS rules, and may take on a security state different and independent of the other system components. Device shutdown or reboot, either initiated by the user or by a low battery state, causes the platform to automatically revert to state 3.

1. *Stock Device, APK unloaded
2. *APK loaded
3. *Device Certificate loaded (encrypted)
4. *Device Certificate loaded (unencrypted)
5. Application and VOIP configurations loaded
6. Application files loaded/VOIP module enabled
7. Application secure data key loaded and files accessible/VOIP incoming/outgoing call enabled
8. Application viewable in application list
9. Application launch enabled in application list
10. Application specific behavior varies based on TTS Measurements/VOIP calls may be automatically dropped based on TTS Measurements An implementation of Secure VOIP may be included with the platform. A particular example of such an implementation is described here. A Secure SIP server with TLS encryption may be used. A method to MIKEY, where each call initiation handshake includes SDP information containing TTS security information, may be used. A single use X509 key signed by the device certificate is used to established identity and to provide a public key to the peer for encrypting the contents of the SDP message. A single use AES256 key is also transmitted by each of the peers for use in securing the VOIP call. The SDP message is finally signed by the certificate to prevent man-in-the-middle attacks. The use of single use certificates and encryption keys provides forward security without having a requirement that security information be stored between sessions. The secure VOIP data connection may be achieved with a variant of SRTP, where an additional channel specification is added to allow for the transmissions of TTS data. Thus, not only can the platform make decisions about ending a call automatically based on local device security measurements, but can also factor in the measurements being made on the peer device.

The platform may also include the ability to allow for other key exchange mechanisms found in other communication implementations. If a method such as Diffie-Hellman is to be used, where security information from prior sessions must be stored, then a means of securely storing that information with the ability to unlock that information quickly enough to establish a call must be provided. A key store for this purpose may be created which stores the security information encrypted with AES256 on the local storage. This information may be decrypted as required so long as the device certificate remains available. The moment that the unencrypted device certificate is purged due to TTS rules, the VOIP security information becomes unavailable until the user unlocks the device certificate and associated PKCS12 store.

When multiple devices take part in a communication, including but not limited to, voice, video, text, email, etc., information about each devices security state, TTS state, and configuration, may be included within the body or header of the message or messaging protocol of the message or as a separate message transmitted independently of the communication message over the same or different data transport mechanism to the device or devices taking part in the communication. Such an inclusion of TTS information allows for each endpoint and intermediate device involved in the communication to make its own measurements using TTS measurement data from itself and other devices to create a system wide understanding of the security state of a system. For instance, this would allow a mobile phone to end a phone call based on rules which take measurements from the other phone endpoint and intermediate network routing equipment. The compromising of the physical security of a router box (perhaps by the opening of the rack cabinet) could create a measurement that is used as a signal by an endpoint phone to terminate the call.

Device hardware control may be implemented on the platform by granting the application device administration access. This allows the device to disable the camera, perform a device lock, or perform a data wipe. Such actions may be taken based on TTS rules. Other device settings may be set through the platform and TTS rules, such as ringer volume and screen brightness. Such settings are not able to be locked out from user modification, but may be checked and updated periodically. The VOIP module ringer is independent of the device ringer that is used for regular calls and is fully controllable.

A standard concern of deploying portable devices is that of interfacing with trusted hardware out of a concern that a compromised external device could introduce a vulnerability into the enterprise system. The X509 Certificate loaded on the device must be placed there in a secure way. As the mobile device typically does not have a means of loading a certificate securely (such as via a smart card), a method may be used for an out of band unidirectional certificate transfer mechanism through the use of QR codes.

The typical deployment of such a system would involve a user authenticating with a standard desktop system which is equipped for hardware token authentication (ie: CAC). Once authenticated, an application can be run which generates an X509 certificate unique for the user and mobile device combination, which is signed by and chained with the users regular certificate. This new certificate has a limited lifespan (perhaps on the order of a work day) and would be registered with a certificate server which supports the SMP deployment. Displayed on the users desktop as one or more QR codes, the PKCS12 keystore, containing the mobile certificate and associated private key, is loaded onto the mobile device through the use of the hardware camera. Once loaded, the PKCS12 store is encrypted with AES256 and stored on the mobile device. Methods of encryption may include a user specified pass code or a hardware token such as a randomly generated short term use QR code or a RFID hardware token. The certificate generally remains in memory, allowing for seamless usage. When it occasionally is purged from memory due to TTS restrictions, it can be decrypted and reloaded through the use of the passcode or hardware token without having to repeat the original QR code loading. This method successfully allows for the transfer of security information in the form of a certificate from a trusted desktop to a less trusted mobile device.

An application server may provide a means to allow the specification of a location of application files, location of a key store, and API for client requests for application specific data. Any files placed within the application file directory can be automatically bundled into a tar file and sent to the client upon application configuration. Files placed in a secure directory will can be encrypted prior to bundling with a key generated for that particular bundle request. The key that is generated is stored in the application key store so that a mobile device may purge the key and not the data, and reload the key at a later time. This method allows for the secure storing of data on the mobile device while limiting the data transfer to recover the secure data to that associated with restoring the encryption key.

Both the System/Configuration Server [FIG. 4-5] and Application Server [FIG. 4-7] connect to the Certificate Server [FIG. 4-1] over a connection which may be encrypted (such as, but not limited to, HTTPS/TLS or SSL) [FIG. 4-9] for the purposes of updating the status of authenticated users throughout the system. For instance, if the digital credentials used to identify a user within the system changes then that change would be reflected upon the various servers which would be identifying connections from the device to the server using the updated credentials. This allows for various servers to be aware of certificate revocation and other changes to user certificate information.

One or more application servers [FIG. 4-7] provide application specific configuration information, TTS definitions and rules, data encryption keys, data, user interface and application code to a specific compartmentalized application container on the device [FIG. 4-12]. The application information is transferred from the application server to the device over a connection which may be encrypted (using methods including, but not limited to, HTTPS/TLS or SSL) [FIG. 4-8].

Each compartmentalized application container [FIG. 4-12] contains multiple parts including: an Application View [FIG. 4-13] which provides a separately executing textual or graphical user interface code allowing the user to interact with the application code and data corresponding to the application independent of and isolated from any other executing code on the system; a set of Application TTS Definitions [FIG. 4-14] which define application specific measurements and security rules surrounding the application; an Application Key Storage [FIG. 4-15] which stores application specific encryption credentials for data stored on the device or transferred to the application server; a set of Application User Interface Code [FIG. 4-16] code which defines the interface for the user, including application specific algorithms, data rendering, and data editing/entry; a set of application specific Application Secure Data [FIG. 4-17] which is stored on the device encrypted using the application specific data encryption keys (data at rest) and is decrypted only as required for display within the application specific executing view code [FIG. 4-13].

Each compartmentalized application container has access to the certificate store Application Access to Certificate Store [FIG. 4-18] for the purpose of obtaining the current user identification certificate for establishing connections to the various application servers.

A separately executing textual or graphical user interface code is presented to the user as [FIG. 4-19] and through connections to the application store and compartmentalized application containers [FIG. 4-20] is able to provide a status of the various application containers to the user, and allows the user to select one or more application containers to interact with (i.e. to display on the screen). The various application containers generally can continue to execute application code even if not currently displayed on the screen. The available applications presented as choices are limited to those allowed by current TTS rules. If a TTS rule is applied which would prevent access to the currently viewed application, then the screen can automatically return back to this selection screen, to another currently running application, or another screen (the actual action being implementation and configuraiton dependent).

The system includes the ability to incorporate a secure VOIP or other communication modules [FIG. 4-21] which is controlled by one or more application containers through Secure VOIP Application Interface [FIG. 4-22]. The VOIP or other communication modules has a separate key store [FIG. 4-23] which provides security information for the encryption of the communications ([FIG. 4-24]).

A TTS Manager and Event Handler [FIG. 4-25] monitors the various hardware and software sensors Sensor Inputs [FIG. 4-26] through the connection Sensor Connections [FIG. 4-27]. It configures the sensors as required for the measurements that have been requested by the various TTS consumers (application store, application container, secure VOIP, etc.) to make the only the necessary measurements and the minimum required sampling rate (unneeded sensors are not used or activated) providing optimal power usage. When the TTS measurements satisfy rule changes which change the secure posture of the device, the TTS manager notifies the consumers to change their operating state accordingly (Application TTS Connection [FIG. 4-30]).

The TTS manager can also directly cause hardware actions on the device (such as screen lock, shutdown, device wipe, vibration, graphical, visual (screen notification or indicator light) and/or noise notification, etc.) through the Hardware Actions [FIG. 4-28] which connects to the TTS manager via Hardware Action Control [FIG. 4-29]. TTS rules are those which define one or more sensor inputs, one or more algorithms which are used to process the sensor input data, and one or more criteria or methods of processing the algorithm output for the determination of the applicability of said TTS rule. As an example, a TTS rule might be used to specify microphone as a sensor input, specify an algorithm which measures the overall background noise level in a room, and indicate that the TTS rule applies when the overall background noise level in the room exceeds some predetermined value. That TTS rule may then be used by the event handler to prevent or to interrupt telephone calls when the TTS rule is found to not apply, as there is a perceived increased risk of eavesdropping by a third party when the ambient sound level in the room falls below the value specified by that particular TTS rule.

The device state and raw TTS measurements may optionally be directly reported to a server (Server TTS Connection [FIG. 4-31]). This allows for the generation of an expanded secure system, where decisions on software, data, and other item access restrictions can be made at a level involving TTS measurements from multiple devices. For instance a mobile phone assigned to a user and a desktop computer in an office, also assigned to that same user, may both send live TTS measurement information to a server which can combine the results to compute the mobile/desktop TTS state. A mobile device and desktop computer which are both in use in different physical locations with the same user credentials would be an indicator that one or both devices are not being operated by the same authorized user.

The system may take on one or more different security states depending on the defined TTS rules and the current TTS and operating state of the system, as illustrated in FIG. 5. The states may move freely from one state to another following the paths of the directed arrows as the security posture of the system changes. This changing of state ensures that in the event of a device security breach, the amount of information available for exploit is at a minimum, mitigating any successful attack.

The first state of the system is when the system is installed on the device (System Installed on Device [FIG. 5-1]). The device to be secured may be obtained with this secure system already installed, or it may be installed by the organization owning or controlling the device, or by the device owner or end user. When the secure system is installed on the device, it may be done as part of the device operating system (such as an extension to the underlying Linux OS or the AndroidOS on an android device) or as an application within the device operating system (such as an APK on an android device). When first installed, the system has no information loaded regarding configuration, TTS, applications, user identification, etc. A keystore is then loaded onto the device (Keystore Loaded onto Device [FIG. 5-2]), which includes at a minimum the security credentials necessary to authenticate with a configuration server and information about the identity of the configuration server (such as hostname or IP address, port, and protocol information). While in this state, the device has all of the necessary information to reach all of the remaining security states of the system, provided that access to the configuration server may be established. The keystore is a component which can security store keys on the device in some encrypted format. The keystore can be locked, preventing access to the keys, or unlocked, allowing access to the keys. The locking mechanism can be some user specified directed (a password, biometric, etc.), a hardware token (SIM card, NFC token, etc.), or some other equivalent method. Once the keystore is unlocked (Keystore unlocked [FIG. 5-3]), the system is able to access the credentials to access the configuration server. Once the configuration of the secure system has been retrieved from the configuration server (Configuration Loaded [FIG. 5-4]), the necessary information about the TTS definitions and operation and security parameters of the system have been the loaded and the various user tasks of the system may commence. The information obtained from the configuration server includes the system wide TTS definition and rules, a list of available application with information necessary to load each application (including application specific TTS definition and rules regarding application listing, loading, and execution), device feature TTS definition and rules, and communication method TTS definition and rules. The system can then enter a state of standard operations being enabled (Operation State [FIG. 5-5]). This is a state in which the secure system may now be viewed as being divided into three categories: those dealing with running secured applications, those dealing with using the various features of the device, and those detailing with communication with other devices and users. These various categories may operate in various security states so long as the main system remains in this operations enabled state. The files and configuration may be unloaded (All Configurations and Files Unloaded [FIG. 5-6]), also removing all information regarding the applications, device features, and communication methods. This prevents sensitive information about these aspects of the system from being available to a device attack. These items may be reinitialized through a reloading of the configuration. The keystore may be locked, preventing access to the configuration loading (Keystore Loaded [FIG. 5-7]), until the user unlocks the store. The keystore may be removed from the device, further preventing any possible access to the keys contained therein (Keystore removed from device [FIG. 5-8]). The secure system may be removed from the device, preventing any trace of the existence of the secure system should the device be compromised or subject to analysis (System uninstalled from device [FIG. 5-9]).

While in an operations enabled state, the various configured applications can independently have its own set of TTS rules defined, and as such, the security state for individual applications may be different than other applications and are not required to be related to or to interact with the security states of the other applications. Each application starts in a state with the application files unloaded (Application Files Unloaded [FIG. 6-A1]). This state may be omitted in systems which do not use external application servers, in which cases the application files remain on the device as part of the secure system installation. The application files are the files necessary to run the application (the executable code), along with other information which is not considered application configuration information, but may include fixed constants of the application including network specifications (server and protocol identifications, etc.), and other information. The purpose of allowing the application files to be unloaded provides a level of security that if the system were to be compromised while in this state, little information about the nature of the application, its purpose, its capabilities, etc., would not be exposed to the attack. The application files necessary for the execution of the application are then loaded (Application Files Loaded [FIG. 6-A2]). Data within the application may be categories into one or more types, with each data type potentially having its own TTS rules and encryption keys. The application may be further restricted by removing the data encryption key associated with the application data from the device ([FIG. 6-D1]), preventing any access to the application data by an attack on the data storage, essentially provided data at rest protection. An application specific data encryption key for a particular data type (Data Encryption Key Loaded [FIG. 6-D2]) is loaded from the application server. This key is user/device specific and is used to encrypt data at rest on the device. The purpose of this key is to allow for encrypted data on the device to remain on the device in a secure way. The data encryption key may be purged from the device, but the encrypted data may remain, allowing for the fast re-access of the encrypted data (by reloading the key from the server) without the need to remove the sensitive data from the device. Data may be initially not stored on the device (Data Not Stored on Device [FIG. 6-D5]) and may be loaded and store on the device in an encrypted state when required (Data Stored on Device Encrypted [FIG. 6-D4]). When both the corresponding encrypted data is stored on the device and the necessary encryption key to decrypted the stored data is loaded, the unencrypted data may be made available for application access and modification (Unencrypted Data Available to Application [FIG. 6-D3]). Note that the data key states and corresponding data storage states for a particular type of data are independent of each other. An application may be made available for display to the user as an available application in a list of applications (([FIG. 6-A3]). If application launch is enabled (Application Launch Enabled [FIG. 6-A4]). The application is not only viewable to the user, but may also be launched/executed by the user. Once launched, the application code begins execution (Normal Application Execution and Termination [FIG. 6-A5]) and may be normally terminated as part of the applications programming or by user direction. While in this state, the application may remain displayed on the screen and available for user interaction, or may be run as a background process, or as an alternation between a user visible foreground and a background process. An application in launch enabled ([FIG. 6-A4]) or running state ([FIG. 6-A5]) may transition to a Application Halted/Launch Disabled [FIG. 6-A6] state, though with any running instance of the application is immediately terminated and the launching of the application is prevented. The application may be further restricted by removing the application from the list of available application ([FIG. 6-A7]).

The application may then be further restricted by the full removal of application data and application executable code from the system (Application Files Unloaded [FIG. 6-A1]), preventing any analysis of the application by an attacker (as the device at this point has absolutely no information about the application).

The secure system may also be used to protect various features of a device. A device feature is any aspect of a device excluding secured applications and communications, and may include but is not limited to, the ability to: operate a camera to take a picture, operate a microphone to record audio, unlock the device, charge the device, use the device as a NFC payment device, allow user directed software installation and removal, allow the user to change system level configuration of the device (including network, security, audio, haptic feedback, and other system level configurations), etc. Once in the operation state ([FIG. 7-1]), each device feature may take its own security state which may be most strictly limited with the feature being disabled ([FIG. 7-B1]), the feature being partially enabled, with certain aspects of the feature restricted or disabled ([FIG. 7-B2]), or with the feature being fully enabled ([FIG. 7-B3]).

The various TTS rules and configurations which cause the control, direction, manipulation, limitation, activation or deactivation of the various security states of the system, application features, data, device features, communication features, and any other states may be defined for any purpose not limited to security and specifically including, but not limited to, regulatory and user safety requirements. For example, a regulation may prevent a commercial truck driver from making personal phone calls or text messaging on a cellular device while the vehicle is in motion and traveling over a certain speed (movement awareness) and on federally regulated roadways (position and location awareness). A secure system on the cellular device may prevent personal phone calls when such conditions are met. As a second example, a regulation may prevent a driver from driving a truck for more than 8 hours in a 24 hour period. A secure system on the truck can perform driver identification (facial and biometric identification) and duty day accounting, and prevent engine start or limit maximum speed if the vehicle is already running once the duty day for a specific driver is exceeded. Both regulatory examples may be enforced in systems implementing the secure system methodology. Furthermore, the secure system on the truck could act in a capacity to ensure system user safety by providing one or more sensors to physically monitor the truck driver for signs of fatigue (for instance, sensors could include those capable of measuring body temperature, facial expression, body position, and reaction time). If driver fatigue was detected, the system could sound an alarm or annunciator, send a message to the dispatcher, limit the speed of the truck, or cause any other action. A secure system on a food storage refrigeration trailer may enhance consumer safety by preventing the unlocking and opening of the trailer when it is not at a specified and authenticated warehouse, when the temperature of the environment outside the trailer doors exceeds some threshold (temperature sensor to determine likelihood of food spoilage), when people outside the trailer who intend to open the trailer to unload it have fevers (thermal imaging sensor to sense potential health danger or contamination hazard for material handling), and for other purposes. A consumer safety implementation may prevent the use of a cellular phone while in the driver's seat of a personal vehicle, but not while in the passenger seat. Such a safety system may be implemented using a secure system on the mobile device, or by using a secure system integrated in the vehicle or as an aftermarket add-on within the vehicle which can sense device position, determine the nature of the call (phone number), determine the situation of the vehicle (is it parked, driving, etc.), determine if there is an emergency (sounds or motion of a crash, etc.), and which can operate signal modification hardware to either allow the device activity or to block the device activity through the disruption, jamming, or other modification of the localized device data connection. This system might allow calls to an emergency number to be made by any phone within the vehicle at any time, while restricting the drivers device for all other purposes, and restricting passenger devices if the noise level in the vehicle exceeds some threshold (representing too much distraction to the driver) or if the driver is determined to be distracted (through measurements of the drivers facial expression, reaction time, etc.). In general, the scope of the secure system may include, but is not limited to, purposes of security, regulatory compliance, system user and bystander safety. Devices employing the secure system methodology may be utilized in the government, military, commercial, civilian, private, public, or any other business or society sector. Devices employing the secure system methodology may include but are not limited to devices considered commercial, consumer, government, military, one-offs, prototypes, COTS (Commercial Off The Shelf), and GOTS (Government Off The Shelf).

Note that the requirement for a configuration server is implementation depended. Other implementations may include a device which includes the security software, but in which the enterprise administration the device is omitted, such that the device and its TTS configuration are defined upon system installation, and all measurements of TTS and policy enforcement occurs solely on the device in absence of any external control and configuration servers. In such a case, the security state of System Installed on Device [FIG. 5-1], Keystore Loaded onto Device [FIG. 5-2], Keystore unlocked [FIG. 5-3], Configuration Loaded [FIG. 5-4], All Configurations and Files Unloaded [FIG. 5-6], Keystore Loaded [FIG. 5-7], Keystore removed from device [FIG. 5-8], and System uninstalled from device [FIG. 5-9] may be omitted from the implementation, and Configuration Loaded [FIG. 5-4] is replaced by a permanent configuration which remains on the device so long as the secure system is installed.

The device may contain one or more communication methods, including but not limited to cellular voice, VOIP (voice over IP), voice and/or video over any data carrying method, text communication (SMS or by any other method), email, any combination thereof, or another other transmission or receipt of data from this device to any other device or system in an manner which could be considered communication. For each communication method on the device, the security state of that method may take on a number of different states independent of any other the security states of any other communication method on the device. Once in the operation state ([FIG. 8-1]), each communication method (CM) can independent security states including, beginning with having a configuration (including TTS rules) loaded ([FIG. 8-C1]). Once configured, the communication method may go into a keystore access disabled state ([FIG. 8-C7]) whereby the necessary credentials required to establish and secure the communication are unavailable to the CM, thus preventing unauthorized use or attack revealing the nature of the CM. The keystore access may be enabled, allowing access to CM related data and configuration, and to allow for the encryption of communication ([FIG. 8-C2]). Incoming and/or outgoing communication may be enabled (together or individually) ([FIG. 8-C3]). Communication may then be established between the device and another user/device/etc. ([FIG. 8-C4]). An active and ongoing communication connection may be forcefully terminated ([FIG. 8-C5]). Incoming and outgoing communication capability may be prohibited (together or individually) ([FIG. 8-C6]), from which point the communication method may be further restricted through the preventing of the keystore access and the unloading the communication configuration.

A particular example of the implementation of the system is shown in FIG. 9. One or more server computers (Server [FIG. 9-1]) act as the system and application configuration servers. These machines receive periodic TTS measurements from both a mobile device (Mobile Device [FIG. 9-2]), and a desktop device (Desktop Computer [FIG. 9-3]), both running this secure system. Furthermore, the server(s) are configured to interpret and process these TTS measurements through one or more algorithms in a manner which may be used to create a global TTS picture of the entire enterprise system including all devices with the secure system. For instance, an algorithm looking for measurements indicating if a system was currently in use by a user, and if so where the device was currently physically located (possibly from a GPS location measurement), and who was currently using the system (as per the authenticated user credentials, device assignment to a user, and perhaps through real time user identification through biometric/video/audio means). A security alert could be generated by the server in cases where the measurements indicate that a state exists in the global system which fails a security test. For instance, a user working on a fixed location desktop computer could not also simultaneously be working on a mobile device located a substantial distance from the desktop machine. In such a case, it is clear that at least one and perhaps both of the systems may be subject to a security violation including use by unauthorized persons. In such a case, and as determined by the specific implementation, the server generated alert could cause automatic actions on the offending devices (forced user logoff, device wipe, etc.), and could send notification to enterprise security systems and personal to act upon the alert.

The process of performing the out of band certificate loading may be achieved through the inserting of a memory or data storage device containing digital certificate information, including but limited to, a SIM card, SD card, or magnetic disk, into the protected device whereby the protected device loads the necessary files from the inserted device for use within the system.

The process of performing the out of band certificate loading may further be achieved through the following unique and novel method which is a subject of this invention and is presented in FIG. 10.

An authorized user of the system may authenticate with a source computer [FIG. 10-1] or other electronic system running a particular program established for this process using any common available method, including but not limited to entering a password, providing a SIM card, or entering other credentials. Once authenticated [FIG. 10-4], the user may direct the software to either obtain existing digital certificate information or to create new digital certificate information corresponding to the user and device that is to be provisioned, either case requiring a data connection [FIG. 10-6] to the certificate server from the source computer [FIG. 10-3]. The digital certificate information may be stored in a PKCS12 store, or in any other form. The system will create a bundle of data [FIG. 10-9] comprising of the data in the certificate store [FIG. 10-8] and optionally other data [FIG. 10-7], including but not limited to, system settings, location of the system configuration or application servers, user configuration information, application information, or any other data. The resulting bundle of data is prepared for encoding into a multidimensional pictorial or other physical representation. This could include optionally encrypting the bundle of data [FIG. 10-10] using user provided credentials, encoding the bundle of data into a different format (i.e. Base 64), and encoding the resulting data into the multidimensional pictorial or other physical representation [FIG. 10-11] (i.e. a two dimensional bar code, such as a QR code, a three dimensional hologram, or a complex higher dimensional representation). The software would then, either automatically or at the users direction, display the multi dimension pictorial or other physical representation [FIG. 10-12], through a monitor or other data output hardware. The physical representation is displayed in a volatile manner (such as on a computer screen) which does not allow for permanent versions or duplicates of the representation to be made (i.e. by printing). The protected device [FIG. 10-2] would use an attached digital camera or other physical input device to capture an image or physical representation [FIG. 10-14] of the computer monitor or other data output hardware which is projecting or emitting a multi dimensional data representation. This data capture is unidirectional (transferring only from the source server to the protected device) and is considered out of band, since no physical data connection is required [FIG. 10-13]. The image, once captured by the protected device, is processed by the protected device where the data is extracted. The process by which the data was prepared is reversed, which includes decoding the multi-dimensional data representation [FIG. 10-15], optionally unencoding the data (i.e. Base64 to byte conversion), optionally decrypting the data representation [FIG. 10-16], extracting the certificate store [FIG. 10-18] and optional additional data [FIG. 10-19] from the data bundle [FIG. 10-17]. The resulting certificate store and optional additional data are then made available for use within the protected system [FIG. 10-21]. This out of band credential transfer process provides a means of transferring data from one computer system to another in a unidirectional manner. By requiring the user to authenticate with the source computer, multi-factor authentication is achieved (both the authentication of the user to the source computer and the provisioning of the device with the credential information which requires the physical presence of the protected device and user). To ensure that the physical representation is captured by only one device and is not retained (i.e. by taking a photograph or copying the representation) for use in provisioning additional devices, the data bundle may include an expiration date, whereby a protected device running the software would be prevented from processing data from an expired data bundle. Additionally, a requirement might be made that the protected device must register with the configuration server or other server within a short time window after loading the data to confirm receipt of the data [FIG. 10-20]. The failure to register within the time window, or the registration of multiple devices with the same credentials could be used as a trigger to invalid that particular user device certificate and related credential information.

A particular implementation of the system may use a mobile device as a secure token in a two factor authentication scheme. For instance, a briefcase may contain a lock implementing the secure system which is unlocked via traditional means (e.g., a key or a passcode) so long as a second authentication token is also present. That second authentication token may be in the form of a mobile device which includes the secure software and TTS rules. That authentication token is only considered present when the device is within some close proximity to the briefcase and certain TTS rules are satisfied. The authentication token communicates with the briefcase via BlueTooth, NFC, WiFi, direct wire or some other method by which TTS rules on the briefcase interpret the measurements and authentication data from the authentication token device to determine if the unlocking of the lock on the briefcase should be allowed.

A TTS rule may be implemented in a manner which employs machine learning and which allows the definition of the rule to evolve overtime with or without external intervention. For instance, machine learning techniques, such as but not limited to an artificial neural network, may be used to recognize after some period of training time what is considered a normal use of a secure system. Any further use of the system would involve the comparison of the sensor measurements to the learned normal usage pattern. That further use which is considered normal usage within some statistical certainty would pass the TTS rule. That further use which does not pass the TTS rule is identified as a use which does not represent normal usage and may be used as a basis to deny or limit a secure system function, or as a step which would prompt some internal or external action requiring the presentation of further authentication or verification, through which the machine learning technique of the TTS rule could be further trained to recognized the newly authorized usage pattern as a type of usual system usage in the future.

A particular implementation of the system may use a secure system device which has a door lock peripheral and unlock mechanism. Like a typical door lock, a user would unlock the door in part with the presentation of a key, code, badge, biometric, or some other authorizing information. The secure system then allows a further access control in the form of one or more TTS rules which must be satisfied after the presentation of a correct key in order for the door to unlock. The secure system device may have TTS rules defined which take simple measurements representing the conditions within the vicinity of the door to determine if the door should be unlocked, including, but not limited to, the time of day, the lighting conditions, the number of people present, the spacing between people, the rate of movement of people, object recognition including identifying what objects are present alone or in the possession of a person, identification of the recognition of the inability to identify persons or object, sounds present (such as if an alarm nearby is sounding), or vibrations (such as if there is an earthquake). The secure system device may have TTS rules defined which implement machine learning techniques to determine typical usage over time. For instance, a rule may allow key entry to any person who has previously entered the door a number of times at similar times of day and carrying similar objects. If that same person were to attempt entry at an atypical time of day or carrying objects different than normal behavior, that rule may not be passed. The failure of a TTS rule which involves machine learning techniques may allow for a user directed training feedback mechanism, whereby the person may need to enter additional authentication information to verify that the attempted use of the system is an allowed usage. After successful entry of the verification information, the machine learning techniques employed by the TTS rule would be further trained to recognize such future entry attempts as authorized. The failure of a TTS rule which involves machine learning techniques may allow for a system directed training feedback mechanism, whereby the failure of the TTS rule may send a message to a security station, where security personnel or security system may independently verify the attempted access. A successful confirmation of the attempted access by the security personnel or security system would be used to train the machine learning technique employed by the TTS rule to recognize such future entry attempts as authorized.

A particular example of an implementation of the secure system is presented in FIG. 11. Here, the purpose of the system is to provide a Mobile Secure Compartmented Intelligence Facility (M-SCIF). The system provides voice and/or video secure conferencing capability between users in one or more locations and secures each local location through the use of one or more encapsulating electrically conductive tents (to prevent electromagnetic signal penetration or emission), active electromagnetic detection hardware (to identify unauthorized electronic devices within the M-SCIF), and/or counter measures (hardware and/or software based).

The M-SCIF is implemented using a central configuration server [FIG. 11-1] which manages a list of authorized system locations and users, along with security credentials. The Secure Session Initiation Protocol server (SSIP), or a similar protocol, which may be on the same or different physical hardware, provides a directory lookup server so that voice/video calls initiated from one physical location may be directed to the appropriate destination. This system is not limited to using SSIP, and any other point to point, multi-point, or central server communication initiation protocol may be used.

Each physical location where an M-SCIF is deployed [FIG. 11-2] contains a local router [FIG. 11-3] and one or more handheld devices [FIG. 11-4]. The local router is configured through a secure connection to the configuration server and initiates voice/video calls through the SSIP server [FIG. 11-7]. The handheld devices provide control of the local router. One or more handheld devices located within a given physical location allow for communication between users in the same location. The voice/video signals from devices in one location may also be routed to handsets in other physical locations [FIG. 11-6]. The router contains sensor hardware [FIG. 11-5] consisting of optionally an electromagnetic spectrum sensor and other other sensors. When an electromagnetic spectrum sensor is deployed, measurements can be made regarding the active presence of electronic devices. When electronic devices are detected which are not authorized, the detection of such devices provides a TTS input into the secure system methodology which is then used to perform system actions such as terminating or prohibiting calls between users.

A detailed description of the functional diagram of the router box is given in FIG. 12. The router box [FIG. 12-1] contains a central processing unit (CPU) [FIG. 12-2]. The CPU interfaces with a Near Field Communications (NFC) peripheral acting in either peer to peer or tag emulation mode [FIG. 12-3]. This NFC interface allows for the handheld devices which provide user endpoints to be associated with the router box for both authentication and configuration purposes. All data connections between the handheld devices to the router box, router box to router box, and router box to handheld device are encrypted. The encryption keys used may differ for each leg of the data transport, and the unencrypted combined signals captured within a location may be available on the router box platform for use within that physical device. Other methods of authentication and configuration of the devices can also be used which rely on data connections including but not limited to WiFi, Bluetooth, infrared (IR), direct wire, QR (or other single or multi dimensional visual data representation) Image Capture. The router box may optionally be attached to cellular [FIG. 12-4], WiFi [FIG. 12-13], or ethernet network access [FIG. 12-14]. The router box implements the secure platform methodology and includes sensor inputs including electromagnetic spectrum device identification [FIG. 12-5] and other sensors [FIG. 12-7], which may include but are not limited to audio, motion, proximity, vibration, and movement sensors. Hardware actions that can be implemented based on security settings include countermeasures such as a electromagnetic frequency jammer [FIG. 12-6] which can precisely target unauthorized devices identified by the electromagnetic spectrum device identification system in order to disable or block operations of the unauthorized devices, including the disabling of the device or the blocking of transmissions or data capture by those unauthorized devices.

The router box may optionally also provide a local ambient audio noise generation system as a countermeasure against physical recording devices which are not detectable by the electromagnetic spectrum device identification system. The audio generated by user action (users speaking in a voice or video conversation) in the room is routed through the router box and is decrypted there providing a combined (mixed) audio signal representative of the sounds generated within the room. That audio signal [FIG. 12-8] is fed from the router box CPU to digital signal processor(s) [FIG. 12-9] where random white or pink noise is generated and modified through the inclusion of the actual recorded sound signal such that it is not possible to extract the original sound signal from the generated white noise. The resulting modified white noise is passed through an amplifier [FIG. 12-10] and to audio ports [FIG. 12-11] providing external connections to one or more modules containing a speaker and/or a microphone [FIG. 12-12] located throughout the M-SCIF physical area. The inclusion of microphones throughout the area provides additional feedback into the DSP(s) allowing for fine tuning of the modified white noise generation to ensure that no user generated audio content is recoverable. The white noise that is generated, amplified, and broadcast on the speakers is of substantial power such that two users talking to each other in the same room cannot actually hear each other without the use of the handsets. To facilitate use of the handsets, the handsets may be attached to secure encrypted bluetooth or wired headsets (speaker and microphone) which support built in noise cancellation capabilities.

As disclosed herein, in accordance with particular embodiments, a device may include a sensor such as: an accelerometer; a gyroscope; an ambient light sensor; a device screen backlight level sensor; an audio sensor (including microphone); a GPS or other location or positioning providing sensor; a camera; a WiFi antenna or connection; a cellular antenna or connection; a packet radio; a data radio; a voice radio; a Bluetooth antenna or connection; a thermometer or other temperature sensor; a barometer or other pressure sensor; a biometric input device; a Near Field Communication (NFC) antenna or connection; a camera; a proximity sensor; a radiation, chemical, or biological detector; a biomechanics sensor; a biomedical sensor; an electric or magnetic field sensor; an electromagnetic spectrum analyzer; an electromagnetic signal detector; an infrared sensor; an infrared camera; a sonar imaging device; a sonar range finder; a laser range finder; a data connection; and/or one or more software sensors including values provided by the device hardware, operating system, and other software modules or programs regarding the current operational state and configuration of the device.

As used herein, the term "data connection" may comprise a wired or wireless connection through which data is transmitted and/or received. For example, a data connection may comprise a wired connection using an Ethernet cable, a coaxial cable, a connection using power lines (such as a broadband over power line ("BPL") connection), USB, Firewire (IEEE 1394), GPIB (IEEE 488), parallel port (IEEE 1284), RS-232, I2C, SPI or any other wired data connection. A data connection may further comprise a wireless connection using an antenna such as Cellular, Radio Frequency (RF), WiFi, Bluetooth, NFC, a satellite connection, a Zigbee connection, or any other wireless data connection.

As used herein, the term "communication data" may comprise any data that transmitted or received with the goal of enabling communication. For example, communication data may comprise voice, video, text or other data that is exchanged between devices, including data transmitted using a cellular connection or data transmitted using a communication protocol such as Voice over IP ("VOIP"). The transmission of communication data may be in real time (such as a voice conversion) or via a store and retrieve or a store and forward method (such as email).

As used herein, the term "sensor data" refers to data collected from any type of sensor. A "measurement" may comprise any one or more values collected from any type of sensor. A measurement may further comprise one or more other measurements for which the values of said other measurements have been combined, filtered, algorithmically processed, altered, adjusted, or otherwise modified to produce the resulting value of the said measurement.

The following illustrations is provided by way of example and not limitation. Accordingly, embodiments of the present invention may comprise the following numbered examples.

1. The methodology described may be implemented in an electronic system or device as either software, hardware, firmware, or a combination of the above.

2. The electronic system or device that the system of example 1 may be implemented on includes, but is not limited to, a server computer, desktop computer, embedded computer, mobile device, mobile phone, mobile tablet computer, or other mobile or non-mobile computer system. The electronic system or device may or may not have a screen, user interface, keyboard, mouse, microphone, speaker, or other various forms of user input or output.

3. A secure computing system, comprising: one or more devices to be secured (protected device), configuration server, application server, data server, sensor hardware and/or software, Tailored Trustworthy Space (TTS) definitions, and the identification of the various TTS scenarios based on sensor measurements, and configurable hardware or software actions, including application and data access and feature controls, to be performed for various TTS scenarios.

4. The device to be secured (protected device) of example 3 implements the secure system methodology as a system preinstalled on a device by device manufacturer, installed by a reseller, or installed by a device owner or third party. It may be part of the device hardware, part of the device operating system, run as an application running on top of a device operating system, or as any combination thereof. When run as an application, the secure system may be unloaded from the device, and in doing so, preventing evidence of the prior existence of the secure system on the device once unloaded.

5. The device to be secured (protected device) of example 3 may be implemented in a special case where the device is an embedded system preloaded with the necessary configure, application, and data, as to allow the device to operate with the secure system methodology as a single and isolated device in absence of any other system components. In such a case, the TTS measurements and rules act only within the embedded system and are not shared external to that system and provide for a dynamically changing security state within the embedded system as a stand alone solution.

6. The device to be secured (protected device) of example 3 further comprising a combination of hardware, firmware, and/or software which provides the ability to process sensor and other data input, calculate measurements based upon that input representative of the operating posture of the device and other conclusions, apply those measurements to a set of rules providing varying levels of security and other access to application functions, data, device features, and communication methods, and other information, procedures, functions, and hardware, and provide a means for running of applications in a secure manner in which the security access rules are strictly enforced. The rules define the various Tailored Trustworthy Spaces based on TTS measurement definitions, along with the actions to take when in a particular TTS scenario.

7. The device to be secured (protected device) of example 3 further comprising a TTS manager component, through which all sensor measurements and TTS measurements are performed, such that measurement definitions which share data sources and data processing may reuse and share the same data resources to minimize power and CPU consumption on the protected device.

8. The device to be secured (protected device) of example 3 to be secured by TTS rules may take on states regarding the operational level of the overall secure system and depending on the result of the application of the TTS rules, including but not limited to the installation or uninstallation of the secure system from the device, the loading or unloading of the keystore holding device and user identification credentials on the device, the unlocking or locking of the keystore, the loading or unloading of system configuration, and the state in which the device is said to be in a normal operational state.

9. The device keystore of example 3 is designed to hold, among other things, a certificate or other identification of the device and/or device user. This certificate or other information is loaded into the keystore through out of band certification loading via a SIM card, SD, Disk, NFC token, or other method. This certificate may also be loaded through a QR capture or the capture of any physical representation of the certificate information, as displayed by a separate system for this purpose.

10. The device to be secured (protected device) of example 3 further comprising of zero or more application containers managed by a single application configuration manager, each of which includes application code, configuration, TTS definitions and rules, data, and other components, stored in such a way as to provide compartmentalization and isolation from other application containers and other parts of the device and system.

11. The application manager of example 18 to be secured by TTS rules may take on states regarding the operational level of the application manager and depending on the result of the application of the TTS rules, including but not limited to, the application configuration being loaded or unloaded.

12. The particular application container of example 19 of an individual application to be secured by TTS rules may take on states regarding the operational level of the particular application container and depending on the result of the application of the TTS rules, including but not limited to, application files loaded or unloaded, application listing in the list of available applications allowed or disallowed, application launch enabled or disabled, application is in normal execution mode, or application is force terminated/halted.

13. The application container of example 18 further comprising of one or more data containers, each of which holds data with a particular set of TTS definitions and rules applying to this particular type of data.

14. The data container of example 16 further which may store the data on the device either unencrypted or encrypted.

15. The data container of example 16, which when storing data encrypted, may enable or disable access to the encryption key by TTS rules.

16. The data container of example 16, which when storing data encrypted, may keep a copy of the encryption key on the application server or another server, and which may remove the encryption key from the device without removing the data as a means of securely storing the data at rest. As the encryption key does not exist on the device, the encrypted data is not usable by any attacker, yet the process of retrieving the data by the authorized user simply requires the reloading of the key from the remote server, thus minimizing the data transfer to the size of the key and not requiring the reloading of the entire set of data to the device.

17. The data container of example 16 to be secured by TTS rules may take on states regarding the operational level of the data container and depending on the result of the application of the TTS rules, including but not limited to, data encryption key removed or loaded, data stored or not stored locally on the device, and unencrypted data available to the application and user.

18. The device to be secured (protected device) of example 3 further comprising of zero or more device features to be secured by TTS rules, where a feature is generally a hardware or software component of the device and may include the user of a camera or microphone, the ability to unlock, turn on, or turn off the device, the ability to enable or disable network access, WiFi, BlueTooth, NFC, or other technologies, the ability to transfer data, the ability to install or remove applications, etc. The device feature may also cause hardware actions when the TTS rule is satisfied, such as a screen notification or the illumination of an indicator light, the sounding of an alarm or other audible signal, a device lock or wipe, etc. The TTS rules may be particular to a single device feature or general to a set of features.

19. Each of the individual device features of example 18 to be secured by TTS rules may take on states regarding the operational level of the feature and depending on the result of the application of the TTS rules, including but not limited to, the total disabling, a partial enabling, or a complete enabling of the device feature.

20. The device to be secured (protected device) of example 3 further comprising of zero or more communication methods to be secured by TTS rules, where a communication method may include hardware and/or software such as a cellular phone, network based Voice Over IP (VOIP), video conferencing, SMS, text messaging, chat, etc. The TTS rules may be particular to a single communication method or general to a set of communication methods.

21. Each of the individual communication method of example 20 to be secured by TTS rules may take on states regarding the operational level of the communication method and depending on the result of the application of the TTS rules, including but not limited to, the loading and unloading of the communication method configuration, the disabling and enabling of the keystore access used to hold credentials and encryption keys used to secure the communication method, the enabling and disabling of outgoing and/or incoming calls, the allowing of a communication to proceed and continue, and the forcing of an ongoing communication to terminate.

22. The configuration server of example 3 further comprising a server software and user interface whereby the management of users, application servers, security definitions, sensor measurement definitions, and other configuration information are stored, managed, changed, saved, and provided to the devices to be configured. The various functions of the configuration server may also be divided among various configuration servers to provide compartmentalization or for other purposes.

23. The protected device of example 6 wherein the device is configured to access the configuration server of example 22 in a manner which loads the correct configuration data on the device, as pertaining to the identity of the device, device owner, and device user, for use by all related systems on the device which perform functions relating to the securing of the device as per the methodology of example 1.

24. The application server of example 3 further comprising a server software and user interface whereby the management of users, security definitions, sensor measurement definitions, other configuration information, application files including application code and data pertaining to a particular application are stored, managed, changed, saved, and provided to the devices to be configured. The various functions of the application server may also be divided among various application servers to provide compartmentalization or for other purposes. An application server may contain information describing one or more applications, and multiple application servers may be utilized.

25. The data server of example 3 further comprising a server software and user interface whereby the management of users, security definitions, sensor measurement definitions, other configuration information, pertaining to a particular class of data are stored, managed, changed, saved, and provided to the devices to be configured. The various functions of the data server may also be divided among various data servers to provide compartmentalization or data siloing or for other purposes. A data server may contain information accessible to one or more applications which are run on the protected device. A data server providing data for a particular application may also be incorporated into the functioning of the application server itself, and need not be a separate object.

26. The protected device of example 6 may save data to and retrieve data from the application and/or data server of example 3. The data may be specific to the user and device, specific to the user, specific to the device, or general and shared among all users of the application and/or system. The transfer of the data between the protected device and application server may be made over an unencrypted or encrypted connection. The data furthermore may be unencrypted or encrypted using a key known only to the protected device or known both to the protected device and the application server and/or system.

27. The sensors comprised of hardware and/or software of example 3 wherein local or remote measurements of a device's operating conditions are recorded and made available for on device or off device processing, which may be performed in real time or as a batch process, and which may be embedded within the device, attached to the device as peripherals, or operated external to the device.

28. The sensors of example 27 further which as determined by the device use case and desired measurements may include and are not limited to: accelerometer; gyroscope; ambient light sensor; device screen backlight level sensor; audio sensor (including microphone); GPS or other location or positioning providing sensor; camera; WiFi; cellular; packet radio; data radio; voice radio; bluetooth; thermometer; barometer; biometric input; Near Field Communication (NFC); camera; proximity sensor; radiation, chemical, or biological detector; biomechanics sensor; biomedical sensor; electric or magnetic field sensor; electromagnetic spectrum analyzer; electromagnetic signal detector; infrared sensor; infrared camera; sonar imaging; sonar range finder; laser range finder; software sensors including values provided by the device hardware, operating system, and other sensors regarding the current operational state and configuration of the device.

29. The data obtained from the sensors of example 28 may be made into TTS measurements through processing. The various measurements and corresponding data capture, analysis, and processing may be performed in software, hardware (including specialized hardware such as digital signal processing circuits or general hardware such as a standard CPU), or a combination of both.

30. Any combination of data obtained from one or more sources may be used to make TTS measurements, with the sources being comprised of: the sensors of example 28, data from external sources including a data file on the device or a data source on a networked or connected device, and/or live data from other devices made available through physical connection or network connection.

31. A subset of sensors of example 28, including but not limited to audio, wherein the following detailed measurements regarding ambient audio can be made including but not limited to ambient audio detection of power level, peak frequency, a sounding alarm, a human voice conversation, a known identifiable human voice, crowd noise, silence, white noise, colored noise.

32. The measurements of example 31 may in part be interpreted as representing a number of people within range of the protected device, and the existence or absence of the authorized user or users of the device being within some range of the device.

33. The measurements of example 31 may in part be interpreted as representing the amount of noise present in the vicinity of a device which may be used as a measurement as to the likelihood that a bystander can hear noise generated either by the device or the device user.

34. The results of the measurements of example 32 and/or example 33 may be used to make a TTS measurement representing the likelihood that a spoken communication (such as a phone call) may be overheard by a bystander. This measurement may be used by a TTS rule which restricts the ability to make and continue a communication to only occur when the likelihood of a bystander overhearing the communication is below some predetermined acceptable threshold. This TTS rule may be further expanded, so that restrictions based on the amount of ambient noise are only applied when other humans are detected within some distance of the device, with that detection being made through any TTS measurement available providing such information.

35. The measurements of example 31 may be made through a process that may include, but is not limited to, the application of a Fourier Transform to provide frequency spectrum information, the application of triangle filters, peak filters, peak identification, harmonic filters, harmonics identification, fundamental frequency identification, and other filters to the frequency spectrum, algorithms to identify the existence of a human voice, the identity of a voice, and/or voice print recognition, and algorithms to identify noise generated by various animate and inanimate objects including living animals, sounds of nature (such as blowing wind or rain), and operational sounds (such as fans running), and human interface sounds (such as keys being pressed, or beeping or alarms) generated by various types of equipment.

36. A subset of sensors of example 28, including but not limited to accelerometer, gyroscope, and audio, wherein the following detailed measurements regarding user movement can be made including but not limited to determining probabilities that the user is standing still, walking, running in a straight line, running in an evasive manner, falling, walking or running up or down stairs, sitting, traveling in a vehicle.

37. The measurements of example 36 regarding the motion of the user and device may be made, but is not limited to this particular process of, processing of accelerometer data through a sliding window Discrete Fourier Transform (DFT) using both device and global coordinate systems along the x, y, z axis, in the xy, yz, xz planes, as a magnitude in all dimensions xyz, and as a rotation along the x, y, z axis, to provide movement frequency spectrum information 38. A subset of sensors of example 28, including but not limited to accelerometer, gyroscope, and audio, wherein the following detailed measurements regarding device movement can be made including but not limited to determining probabilities that the device is left on still on a surface (such as a table), being held by a human, being carried in a manner in which the device is not in use (such as in a pocket or at a person's side), being carried in a manner in which the device is in use (such as in front of a person), being tossed, shaken, thrown, or dropped.

39. The measurements of example 38, may be made, but are not limited to, making measurements along the global z, xy plane, and xy rotation, with variables being generated from the frequency and power information contained in these spectrums. A log-likelihood function, neural network, or other event identification method may be used, to make probability estimates that the device is still on a table, or that the device is being carried by a user who is either standing, walking while reading, walking with the device at his side, running in a straight line, running in a zig-zag (or evasive) pattern, or normally or quickly walking up and down a flight of stairs, and other types of motion identification.

40. A measurement of the sensors of example 38, in the device coordinate system, where measurements are made to indicate user initiated actions, such as device shake, rotate, and flip, and which are used to create TTS measurements and TTS rules used to perform actions based on user initiated actions. For instance, the user may shake the device to unload data keys for a particular application.

41. A measurement of the sensors of example 38, in the global coordinate system, where measurements are made to indicate unintentional actions, such as the dropping of a device from a height or the tossing of a device some distance. A TTS measurement may be made for such situations with a TTS rule that may choose to perform some action in anticipation of the device being lost by the user. For instance, if dropped from height exceeding 50 ft., a device wipe may be initialized prior to impact under the assumption that data on the soon to be heavily damaged device would only be recovered by an unauthorized user of the device (as the authorized user would just get a new device and reload the data from the servers once authenticated).

42. A subset of sensors of example 28, including but not limited to those pertaining to biometric input, camera, and audio, wherein measurements regarding user identification may be made through face, voice, biometric, or other methods of user recognition and identification.

43. A subset of sensors of example 28, including but not limited to those pertaining to biometric input, camera, and audio, wherein measurements regarding the number of (or absence of) people or device users who may or may not be within the proximity of the device or interacting with the device may be made.

44. A particular measurement of example 43 in which the number of faces visible to the camera located on the screen side of the device may be used as a TTS measurement as to the number of people viewing the screen. Such a measurement may be used by a TTS rule to limit the display of certain data when the number of faces viewing the screen reaches a particular threshold. For instance, sensitive data might only be shown when exactly 1 face is in view of the screen, and 0 faces makes the display of data unnecessary, and 2 or more faces would indicate that someone other than the potential authorized user is also viewing the data.

45. A particular measurement of example 43 in which the identification of the people whose faces are visible to the camera located on the screen side of the device would provide a TTS measurement through which a TTS rule could take action depending on if all, some, or none of the people viewing the screen were authorized to do so.

46. A subset of sensors of example 28, including but not limited to those pertaining to visual (camera), audio (microphone, vibration, and accelerometer), taste, smell, and touch, wherein measurements regarding the location of the device may be made through individual object recognition whereby recognition of a physical location may be made through the identification of the various objects within a location.

47. A subset of sensors of example 28, including but not limited to those pertaining to visual (camera), audio (microphone, vibration, and accelerometer), taste, smell, and touch, wherein measurements regarding the location of the device may be made through general location recognition whereby recognition of a physical location may be made through the general properties of the location.

48. A subset of sensors of example 28, including but not limited to ambient light sensor and backlight level wherein a measurement regarding the likelihood that an unauthorized party might be able to view the content on the device screen from a distance beyond the distance between the authorized user and the device screen (e.g.: an eavesdropper looking over one's shoulder).

49. A subset of sensors of example 28, including but not limited to GPS, network, WiFi, cellular, and/or external data sources through which a TTS Measurement can be made regarding the location of the device and the trustworthiness of that measurement, where the trustworthiness represents that multiple available location measurements are in agreement, within accuracy limitations. For instance, the agreement of a GPS signal, WiFi based location, and a lookup of the recorded location of the currently in use cellular tower would indicate good agreement and a trustworthy location measurement, whereas a discrepancy in any of those location measurements would indicate the potential compromise or spoofing of one or more location providers.

50. The measurement of the location of the device of example 49 may be used to detect cases of impossible travel of a device. For instance if a device suddenly changes apparent location by a great distance over a short period of time, such a measurement could indicate unauthorized travel methods (such as air travel) or the spoofing or tampering of some location data provider on the device.

51. A subset of sensors of example 28, including but not limited to GPS, network, WiFi, cellular, and/or external data sources through which a TTS Measurement can be made regarding the current location of the device as compared to the recorded location of the currently connected cellular tower. Such a measurement provides a security assessment of the cellular tower and can indicate connection to an unauthorized or spoofed cellular tower.

52. A subset of sensors of example 28, including but not limited to, microphone, thermometer, barometer, pressure, location, and light sensors may be used to determine if a device is currently located outside or inside a building or structure, along with the approximate elevation of the device. Combined with external data regarding ground level elevations, the elevation measurement may be translated to a floor number of a building if the device is within a building. Combined with external current weather information, the correlation between the reported weather and device measurements may be used to determine if the device is outside, and may be used to verify the location of the device (such that the weather measured by the device and the external weather data source both report the same weather in the same location).

53. A subset of sensors of example 28, including but not limited to microphone, camera, and proximity sensors may be used for user directed input of a TTS measurement. For instance, a user may be required by a TTS rule to cover the proximity sensor of a device to allow access to some data. Such a requirement might only allow data access while the sensor is covered, allowing the user to covertly restrict access, or to restrict access should the device placement be changed (such as if the device is taken by a passerby from the hands of the authorized user).

54. A subset of sensors of example 28, including but not limited to hardware and software measurements of the device itself, such as CPU and memory consumption, battery level, network activity, the state of the screen (powered on/off), the charging status of the device, the currently running programs on the device, etc., may be used to form TTS measurements through which TTS rules are defined to act upon the various states of the device. For instance, atypical power usage, CPU usage, and memory consumption may be indicative of mal-ware on the device. Unexpected network traffic may indicate unauthorized data exfiltration. In either example case, TTS rules may be defined to lock down the system, protecting applications and data, when such TTS measurements indicate such events.

55. The Tailored Trustworthy Space (TTS) measurement definitions of example 3 each of which are comprised of the description one or more sensor inputs, parameters regarding the configuration of these sensors, the algorithm specifications for combining the various sensor inputs, and the requirements of the combined sensor algorithm outputs which satisfy the requirements of the said TTS. The result of a TTS measurement may also be used as another input into another TTS measurement, allowing for the chaining of data processing and the formulation of complex TTS measurement definitions.

56. The identification of the various TTS scenarios based on sensor measurements definitions of example 3 which is comprised of a software or hardware subsystem which, using the TTS definitions and sensor data, computes the values necessary for TTS situation determination.

57. The identification of the various TTS scenarios of example 56 is made through the application of TTS rules which define one or more TTS measurements, how the resulting values of those measurements should be combined (for instance, the different values may be average or a maximum or minimum among the values may be taken as the resulting value), how that resulting value should be interpreted (for instance the value must be above or below a threshold or within some range for the rule to apply), and what actions to take when the rule is in effect. The TTS rule may apply on a system wide level, may be very granular and apply to only a particular type of data for a single application, or may apply on any level in between the most general and most granular case.

58. The on device processing of data as performed by the subsystem of example 56 may be configured to operate in such a way as to ensure that any processing of sensor data is performed in a pipelined manner which allows multiple consumers of data to share the results of a single computational step which is performed at a rate sufficient to satisfy the date rate requirements of all corresponding consumers. This pipelined and sharing of data processing results is a means of reducing the computational and power consumption on the device which performs the TTS sensor measurement and data processing.

59. The TTS algorithms of example 56 wherein one or more sensor measurements are combined to create an overall measurement which is used for TTS scenario identification. The algorithms may include but are not limited to methods such as simple mathematical functions, step functions, likelihood functions, artificial neural networks, nearest neighbor, and other statistical or mathematical methods for the purpose of event, scenario, action, or other identification.

60. The application and data access and feature controls, to be performed for various TTS scenarios of example 3 which is comprised of a software or hardware subsystem which using identified current TTS situations of example 56 and the TTS definitions of example 55 performs the necessary adjustments to the system to allow or restrict access to various applications, application features, data, and other system components independent of each other.

61. The Tailored Trustworthy Space (TTS) measurements of example 3 may be transmitted on one device and onto another within the secure system. This allows, for example, the TTS Level of an entire communication network consisting of endpoints and internal network components to share TTS measurement values, allowing each part of the system to make its own assessment of the security state of the combined system, and allowing each part of the system to act on its own rules. For example, two devices between which there is a phone call may have data routed through a network switch which also makes TTS measurements within the secure system. The opening of the rack door on the network switch rack may trigger a TTS measurement which is used by a TTS rule on one of the end point devices to termination the phone call. Another example would be the detection of the same user using a mobile device and a desktop computer in two locations at the same time. Through the combination of the TTS measurements, certain TTS rules may be applied which detect this impossible scenario and lock out access to one or both machines while also notifying a security team.

62. The communication between two or more devices of example 61 may also be used in an Enterprise scenario where one or more servers monitor the TTS state of one or more protected devices, thereby generating alerts and notifications to other enterprise systems when the security states of any single or combination of the devices meet some criteria.

63. The communication between two or more devices of example 61 using a variant of SRTP protocol or any other protocol for communications may include TTS measurement and configuration data as an additional data channel or through an addition or modification to that protocol, as a means of providing real time sharing of TTS measurement values across devices.

64. A digital certificate provisioning system, comprising: a source computer system, a generated two dimensional QR code, or any other single or multi dimensioned physical representation of data, containing digital certificate data and/or other information, and a receiving system.

65. The source computer system of example 64 further comprising a screen on which to display the generated two dimensional barcode, or any other single or multi dimensioned physical representation of data, the necessary interface to a digital credential management system, and user interfaces required for authenticating and controlling the source computer.

66. The digital credential management system of example 65 wherein information regarding authorized users of the system are contained, including account information regarding particular users such as but not limited to permitted access duration and time, security and access roles and restrictions, authentication credential information (including passwords, certificates, or biometric information), information regarding previously generated user certificates and certificate issuance status, including a list of previously expired or revoked certificate information.

67. The digital credential management system of example 65 wherein the physical location of such system may be on the same or different hardware than the source computer system of example 64, and when on the same physical hardware, may reside in a different or the same virtual machine as the source computer, and when in the same virtual machine, may be executed as separate or within the same body of software as the source computer.

68. The receiving system of example 64 which can take a picture of or otherwise capture and interpret the physical representation created and displayed by the source computer system, allowing to the unidirectional and out of band transfer of digital certificate data and/or other information from the source system to the receiving system.

69. The requirement to authenticate with the source computer system of example 64 in order to obtain the code to load on the receiving system of example 64 provides a means of multi factor authentication when there is an expiration applied to the generated code requiring the receiving device to load and register with the credential management system within a short time period, as both the authentication of the source system must be performed in the same location in which the receiving system is physically located.

70. A Mobile Secure Compartmentalized Information Facility (M-SCIF) may be created comprised of, but not limited to, an EM shielding tent, a white or pink noise generator, voice scrambling noise generators, secure headset equipment, router boxes providing connectivity between one or more secure headsets at one or more locations, video conferencing capability, EM spectrum analysis for the identification of unauthorized devices or listening or data capture devices, and EM jamming equipment.

71. The white or pink noise generator of example 70 may be configured to produce a noise level suitable to prevent the recording, hearing, or interpretation of sound by a person or device, particularly of spoken word, within a close distance to the origination of the sound.

72. The voice scrambling noise generators of example 70 may be configured to obtain an audio signal (perhaps from a microphone) of a the sound created by a person (perhaps while speaking) That sound is then processed through hardware and/or software such that a speaker may be used to output a signal which will cancel the audio spoken by the person, so that a recording device or another person in close proximity to the person creating the source sound would be unable to discern any meaningful information from that person.

73. Any combination of the white or pink noise generator of example 71 and the voice scrambling noise generators of example 72 may be used together or separately in the M-SCIF.

74. The secure headsets of example 70 are used to capture spoken sound from users of the system, to relay that information securely through a router and then back to the other headsets so that the sound of a speak may be heard by other participants in the communication. A router may not be required in some configurations where the headsets can connect directly to each other.

75. The router of example 70 allows for the connection of multiple physical locations into the same communication.

76. The protocol used to transmit data between headsets may include the TTS measurements from each device within the system, such that all endpoints of the communication may allow continued communication based on TTS rules specific to each device.

What is claimed is:

1. A method for securely and automatically performing functions on an authenticated device comprising a sensor and memory containing third instructions to implement at least one tailored trustworthy space rule ("TTS rule"), first instructions for performing a first function on the authenticated device, and second instructions for performing a second function on the authenticated device, wherein the authenticated device is in an unlocked state, the method comprising:

automatically obtaining a first measurement from the sensor;

prior to performing the first function on the authenticated device, determining that the first measurement satisfies one or more values defined by the at least one TTS rule, and performing the first function by the authenticated device;

prior to performing the second function on the authenticated device, determining that the first measurement fails to satisfy one or more values defined by the at least one TTS rule, and blocking the authenticated device from performing the second function while maintaining the authenticated device in the unlocked state; and while performing the first function on the authenticated device, automatically obtaining a second measurement from the sensor, comparing the second measurement to the one or more values defined by the at least one TTS rule, and only continuing to perform the first function if the second measurement satisfies at least one of the one or more values defined by the at least one TTS rule;

executing, by the authenticated device, the at least one TTS rule;

when a first TTS rule of the at least one TTS rule fails to be satisfied by the first measurement and the second measurement, then automatically unloading application executable code, and deleting application executable code, application configuration, and decrypted application data from the authenticated device; and when a second TTS rule of the at least one TTS rule fails to be satisfied by the first measurement and the second measurement, then automatically unloading a decryption key for application data from the authenticated device and preventing application access to the decrypted application data.

2. The method of claim 1, wherein the authenticated device comprises an accelerometer, a gyroscope, a camera, a microphone, a GPS receiver, a WiFi transceiver, and a cellular transceiver, and wherein the sensor of the authenticated device comprises at least one of an accelerometer, a gyroscope, a camera, a microphone, a GPS receiver, a WiFi transceiver, and a cellular transceiver, and wherein the device becomes authenticated with both an application server and a data server by:

loading, through an out of band process using the camera, at least one user credential on the authenticated device, wherein the at least one user credential comprises a X.509 certificate; and communicating the at least one user credential, with the application server, to authenticate the device with the application server; and communicating the at least one user credential, with the data server, to authenticate the device with the data server;

the method comprising:

providing a plurality of user and device movement measurements by processing with a discrete Fourier transform using measurements obtained from both of the accelerometer and the gyroscope, wherein the processing comprises using both device and global coordinate systems along the x, y, z axis, in the xy, yz, xz planes, as a magnitude in all dimensions xyz, and as a rotation along the x, y, z axis;

automatically obtaining measurements from at least one of the camera, the microphone, the GPS receiver, the WiFi transceiver, and the cellular transceiver, and processing them to determine a location of the authenticated device;

executing, by the authenticated device, the at least one TTS rule;

when the first TTS rule of the at least one TTS rule is satisfied by both the first measurement and the second measurement, then automatically loading the application executable code from the application server, the application configuration from the application server, and the encrypted application data from the data server;

when the second TTS rule of the at least one TTS rule is satisfied by both the first measurement and the second measurement, then automatically loading the decryption key, decrypting the encrypted application data using the decryption key, and accessing the decrypted application data.

3. The method of claim 1, wherein:

the sensor comprises a microphone;

the first measurement comprises a first sound measurement created using the microphone;

said comparing the first measurement to the one or more values defined by the at least one TTS rule comprises:

applying a Fourier transform ("FT") to the first sound measurement to provide first frequency spectrum information in a plurality of bins, and determining a first ambient noise level by measuring a total power level of the first frequency spectrum information in the plurality of bins; and said comparing the first measurement to the one or more values defined by the at least one TTS rule comprises comparing the ambient noise level of the first frequency spectrum information to one or more predetermined ambient noise levels defined by the at least one TTS rule.

4. The method of claim 3, wherein:

said comparing the first measurement to the one or more values defined by the at least one TTS rule further comprises measuring an average power level of the first frequency spectrum information in the plurality of bins and measuring an individual power level for at least one of the bins in the plurality of bins; and said comparing the first measurement to the one or more values defined by the at least one TTS rule further comprises:

comparing the average power level of the first frequency spectrum information to one or more predetermined average power levels defined by the at least one TTS rule, and comparing the individual power level of the at least one of the bins in the plurality of bins to one or more predetermined power levels defined by the at least one TTS rule.

5. The method of claim 4, wherein:

the first sound measurement is created by sampling audio at 44,100 hertz;

said first frequency spectrum information ranges from 10 to 5,000 hertz; and said first plurality of bins have 10 hertz resolution.

6. The method of claim 3, wherein said comparing the first measurement to the one or more value defined by the TTS rule further comprises identifying one or more voices by:

identifying one or more fundamental frequencies in the first frequency spectrum;
identifying one or more harmonics in the first frequency spectrum information;
comparing the identified one or more fundamental frequencies in the first frequency spectrum to one or more predetermined fundamental frequencies defined by the at least one TTS rule; and
comparing the identified one or more harmonics in the first frequency spectrum to a one or more predetermined harmonics defined by the at least one TTS rule.

7. The method of claim 1, wherein:
the sensor comprises an accelerometer;
the first measurement comprises obtaining acceleration data from the accelerometer; and
said comparing the first measurement to the at least one TTS rule comprises comparing the acceleration data to one or more predetermined acceleration values defined by the at least one TTS rule.

8. The method of claim 1, wherein:
the sensor comprises a data connection;
the first measurement comprises obtaining a portion of a plurality of data from the data connection; and
said comparing the first measurement to the one or more predetermined values defined by the at least one TTS rule comprises comparing the content of the portion to one or more predetermined data values defined by the at least one TTS rule.

9. The method of claim 8, wherein:
The device is communicatively coupled via the data connection with a second device comprising a second sensor;
the portion of the plurality of data comprises sensor data representing one or more measurements obtained from the second sensor; and
said comparing the content of the portion to predetermined data defined by the at least one TTS rule comprises comparing the sensor data to one or more predetermined sensor data values defined by the at least one TTS rule.

10. The method of claim 8, wherein:
the device comprises a server and the data connection is used to communicate with a second device;
the portion of the plurality of data comprises data communicated between the server and the second device; and
said comparing the content of the portion to predetermined data defined by the at least one TTS rule comprises comparing, by the server, the content of the portion to one or more predetermined data values defined by the at least one TTS rule.

11. The method of claim 1, wherein:
the authenticated device comprises a data connection, wherein the first measurement comprises at least one of a data connection delay measurement and a data connection rate measurement;
the first measurement comprises obtaining a first portion of a plurality of data from the data connection at least at one of: a first one or more times, and over a duration of time, and obtaining a second portion of a plurality of data from the data connection at a second one or more times; and
said comparing the first measurement to the one or more predetermined values defined by the at least one TTS rule comprises calculating at least one of: a delay, and a rate, by comparing the first one or more times to the second one or more times and comparing the delay to one or more predetermined receive delay values defined by the at least one TTS rule and comparing the rate to one or more predetermined rates defined by the at least one TTS rule, wherein the rate is a ratio of a quantity of data in the first portion to the duration of time.

12. The method of claim 1, further comprising deleting the second instructions for performing the function if either the first or second measurement does not match at least one of the one or more values
defined by the at least one TTS rule.

13. The method of claim 1, wherein:
said function comprises transmitting communication data to a second device;
the sensor comprises a first one or more of a plurality of sensors comprising a microphone, a camera, an accelerometer, a gyroscope, a data connection, or a GPS receiver;
said second device comprises a second sensor comprising a second one or more of the plurality of sensors;
if the first one or more of a plurality of sensors comprises a microphone, each of said first and second measurements comprise obtaining a sound measurement from the microphone;
if the first one or more of a plurality of sensors comprises a camera, each of said first and second measurements comprise obtaining an image from the camera;
if the first one or more of a plurality of sensors comprises an accelerometer, each of said first and second measurements comprise obtaining measured acceleration data from the accelerometer;
if the first one or more of a plurality of sensors comprises a gyroscope, each of said first and second measurements comprise obtaining measured gyroscope data from the gyroscope;
if the first one or more of a plurality of sensors comprises a data connection, each of said first and second measurements comprise obtaining a first portion of a plurality of data from the data connection; and
if the first one or more of a plurality of sensors comprises a GPS receiver, each of said first and second measurements comprise obtaining position data from the GPS receiver.

14. The method of claim 13, wherein one or more values defined by the TTS rules is selected from a group comprising an ambient noise level, an ambient sound characteristic, a number of people present within a specified distance of the device, a number of people viewing a display on the device, a number of voices detected within a specified distance of the device, a measured physical motion of the device, or the physical location of the device.

15. A system for securing one or more devices using a tailored trustworthy space rule ("TTS rule"), comprising:
an authenticated device comprising a processor, a memory, and a sensor, wherein the processor is communicatively coupled to the memory and the sensor, and wherein the authenticated device is in an unlocked state;
wherein the memory contains an application and at least one TTS rule, and the processor is configured to load and execute the application, wherein the application comprises application executable code, application configuration, and application data;
wherein the processor is configured to automatically obtain a first measurement from the sensor prior to loading the application;

wherein the processor is configured to perform a first check comparing the first measurement against one or more values defined by the at least one TTS rule;

wherein, upon passing the first check, the processor is configured to proceed with loading the application and decrypting application data;

wherein, upon failing the first check, the processor is configured to block the loading of the application while maintaining the device in the unlocked state, automatically unload the application from the memory, and delete the application executable code, the application configuration, and decrypted application data from the memory; and wherein the processor is further configured to:
obtain a second measurement from the sensor while executing the application; and
perform a second check comparing the second measurement against the one or more values defined by the at least one TTS rule; and wherein, upon failing a second check, the processor is configured to automatically unload a decryption key for the application data, and prevent application access to the decrypted application data.

16. The system of claim 15, wherein the processor is further configured to:
upon passing the second check, continuing executing the application.

17. The system of claim 16, wherein, upon failing the first check or second check, the processor is configured to apply a restriction defined by the TTS rule so as to limit the functionality of the application.

18. The system of claim 16, wherein, upon failing the first check or second check, the processor is configured to apply a restriction defined by the TTS rule so as to limit the functionality of the device.

19. The system of claim 16, wherein the processor is further configured to:
upon failing the first check, refrain from loading the application and delete the application from the memory; and
upon failing the second check, ceasing executing the application, unload the application, and delete the application from the memory.

20. The system of claim 16, further comprising:
one or more servers communicatively-coupled to the device and configured to transfer a security certificate to a certificate store in the memory using an out-of-band process, transfer the TTS rule to the memory, and transfer the application to the memory.

21. The system of claim 20, further comprising:
wherein the one or more servers comprise at least a first server and a second server, the application comprises a first application, and the TTS rule comprises a first TTS rule;
wherein the first server is configured to transfer the application and the first TTS rule to the memory;
wherein the second server is configured to transfer a second application and a second TTS rule to the memory;
wherein the processor is configured to load and execute the second application, to obtain a third measurement from the sensor prior to loading the second application, and to obtain a fourth measurement from the sensor while executing the second application;
wherein the processor is configured to perform a third check comparing the third measurement against a second one or more values defined by the second TTS rule and a fourth check comparing the fourth measurement against the second one or more values defined by the second TTS rule; and
wherein, upon passing the third check, the processor is configured to proceed with loading the second application and upon passing the fourth check, the processor is configured to continue executing the second application.

22. The system of claim 15, wherein:
the sensor comprises a microphone;
the first measurement comprises a first sound measurement created with the microphone;
the second measurement comprises a second sound measurement created with the microphone;
the device is configured to compare the first measurement to the application-specific TTS rule by:
applying a Fourier transform ("FT") to the first sound measurement to provide first frequency spectrum information in a first plurality of bins, and
determining a first ambient noise level by measuring a total power level of the first frequency spectrum information in the plurality of bins and comparing the ambient noise level of the first frequency spectrum information to a range of ambient noise levels defined by the at least one TTS rule.

23. A non-transitory machine-readable storage medium embodying a set of instructions for securing a device using tailored trustworthy space rules ("TTS rules"), wherein the device is configured to perform a first action and wherein the set of instructions, when executed by a processor in the device, cause the processor to perform operations, the operations comprising:
obtaining a security certificate from a certificate server using an out-of-band process;
encrypting and storing the security certificate in a certificate store on the device;
obtaining a configuration comprising a device-wide TTS rule from a system server;
obtaining application data comprising an application code configured to perform a second action, application configuration, and an application-specific TTS rules from an application server;
obtaining user specific application data comprising information which is at least one of displayed, manipulated, and used by the application code;
securely storing the application data in a compartmentalized application store on the device;
prior to executing the application code, automatically comparing a first measurement from a sensor in the device to the device-wide TTS rule and the application-specific TTS rules;
if the first measurement fails at least one of the device-wide TTS rule and the application-specific TTS rules, then at least one of refraining from executing the application code and preventing the application code from performing the second action in accordance with the device-wide TTS rule or the application-specific TTS rules, respectively;
during execution of the application code, automatically comparing a second measurement from the sensor to the device-wide TTS rule and the application-specific TTS rules;
if the second measurement fails at least one of the device-wide TTS rule and the application-specific TTS rule, then at least one of ceasing execution of the application code and preventing the application code from performing the second action in accordance with the device-wide TTS rule or the application-specific TTS rule, respectively;

if at least one of the first measurement and the second measurement fails the device-wide TTS rule, preventing the device from performing the first action in accordance with the device-wide TTS rule; and prior to the execution of the application code and during execution of the application code, automatically comparing a third measurement from the sensor to the device-wide TTS rules and the application-specific TTS rules;

if the third measurement fails at least one of the device-wide TTS rules and the application-specific TTS rules, then:
  automatically unloading application executable code,
  securely deleting some or all of the user specific application data from the device,
  deleting the application code from the device,
  deleting the application configuration from the device,
  deleting the application-specific TTS rules from the device,
  deleting encryption keys from the device,
  preventing application access to decrypted application data,
  deleting decrypted application data from the device,
  automatically unloading the security certificate from the device, and
  preventing application access to the decrypted application data.

* * * * *